United States Patent
Li

(10) Patent No.: US 11,379,447 B2
(45) Date of Patent: Jul. 5, 2022

(54) METHOD AND SYSTEM FOR ENHANCING IOPS OF A HARD DISK DRIVE SYSTEM BASED ON STORING METADATA IN HOST VOLATILE MEMORY AND DATA IN NON-VOLATILE MEMORY USING A SHARED CONTROLLER

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 222 days.

(21) Appl. No.: 16/783,955

(22) Filed: Feb. 6, 2020

(65) Prior Publication Data

US 2021/0248119 A1 Aug. 12, 2021

(51) Int. Cl.
*G06F 16/22* (2019.01)
*G06F 3/06* (2006.01)

(52) U.S. Cl.
CPC ........ *G06F 16/2228* (2019.01); *G06F 3/0613* (2013.01); *G06F 3/0659* (2013.01); *G06F 3/0685* (2013.01)

(58) Field of Classification Search
CPC .. G06F 16/2228; G06F 3/0613; G06F 3/0659; G06F 3/0685; G06F 3/061; G06F 3/0676; G06F 3/068; G06F 3/064
USPC .......... 711/111, 113, 4, 103; 710/36, 52, 58
See application file for complete search history.

(56) References Cited

U.S. PATENT DOCUMENTS

| | | | |
|---|---|---|---|
| 5,715,471 | A | 2/1998 | Otsuka |
| 7,351,072 | B2 | 4/2008 | Muff |
| 8,527,544 | B1 | 9/2013 | Colgrove |
| 8,819,367 | B1 | 8/2014 | Fallone |
| 8,832,688 | B2 | 9/2014 | Tang |
| 9,031,296 | B2 | 5/2015 | Kaempfer |
| 9,213,627 | B2 | 12/2015 | Van Acht |
| 9,495,263 | B2 | 11/2016 | Pang |
| 9,529,670 | B2 | 12/2016 | O'Connor |
| 9,569,454 | B2 | 2/2017 | Ebsen |
| 9,575,982 | B1 | 2/2017 | Sankara Subramanian |
| 9,607,631 | B2 | 3/2017 | Rausch |

(Continued)

OTHER PUBLICATIONS

C. Wu, D. Wu, H. Chou and C. Cheng, "Rethink the Design of Flash Translation Layers in a Component-Based View", in IEEE Acess, vol. 5, pp. 12895-12912, 2017.

(Continued)

*Primary Examiner* — Hong C Kim
(74) *Attorney, Agent, or Firm* — Shun Yao; Yao Legal Services, Inc.

(57) ABSTRACT

One embodiment provides a system which facilitates operation of a storage system. During operation, the system receives, by a storage engine, a request to write data to a hard disk drive. The system determines metadata associated with the data. The system stores the metadata in a volatile memory associated with the storage engine. The system identifies a physical address in a first non-volatile solid-state memory to which to write the metadata, wherein the first non-volatile solid-state memory is accessible via a controller of the hard disk drive. The system writes the metadata to the first non-volatile solid-state memory based on the physical address. The system writes the data to the hard disk drive.

20 Claims, 11 Drawing Sheets

(56) References Cited

U.S. PATENT DOCUMENTS

| | | | |
|---|---|---|---|
| 9,671,971 | B2 | 6/2017 | Trika |
| 9,836,232 | B1* | 12/2017 | Vasquez .............. G06F 12/0804 |
| 9,852,076 | B1 | 12/2017 | Garg |
| 9,912,530 | B2 | 3/2018 | Singatwaria |
| 9,923,562 | B1* | 3/2018 | Vinson ................... G11C 16/10 |
| 9,946,596 | B2 | 4/2018 | Hashimoto |
| 10,268,390 | B2 | 4/2019 | Warfield |
| 10,361,722 | B2 | 7/2019 | Lee |
| 10,459,663 | B2 | 10/2019 | Agombar |
| 10,642,522 | B2 | 5/2020 | Li |
| 10,649,657 | B2 | 5/2020 | Zaidman |
| 10,678,432 | B1 | 6/2020 | Dreier |
| 10,756,816 | B1 | 8/2020 | Dreier |
| 10,928,847 | B2 | 2/2021 | Suresh |
| 10,990,526 | B1 | 4/2021 | Lam |
| 11,144,250 | B2* | 10/2021 | Li ......................... G11C 16/16 |
| 2001/0046295 | A1 | 11/2001 | Sako |
| 2002/0112085 | A1 | 8/2002 | Berg |
| 2004/0267752 | A1 | 12/2004 | Wong |
| 2005/0138325 | A1 | 6/2005 | Hofstee |
| 2005/0144358 | A1 | 6/2005 | Conley |
| 2006/0101197 | A1 | 5/2006 | Georgis |
| 2006/0156009 | A1 | 7/2006 | Shin |
| 2006/0184813 | A1 | 8/2006 | Bui |
| 2007/0250756 | A1 | 10/2007 | Gower |
| 2007/0266011 | A1 | 11/2007 | Rohrs |
| 2007/0283104 | A1 | 12/2007 | Wellwood |
| 2008/0028223 | A1 | 1/2008 | Rhoads |
| 2008/0065805 | A1 | 3/2008 | Wu |
| 2008/0082731 | A1 | 4/2008 | Karamcheti |
| 2008/0163033 | A1 | 7/2008 | Yim |
| 2008/0195829 | A1 | 8/2008 | Wilsey |
| 2009/0006667 | A1 | 1/2009 | Lin |
| 2009/0125788 | A1 | 5/2009 | Wheeler |
| 2009/0183052 | A1 | 7/2009 | Kanno |
| 2009/0254705 | A1 | 10/2009 | Abali |
| 2009/0307426 | A1 | 12/2009 | Galloway |
| 2010/0281254 | A1 | 11/2010 | Carro |
| 2011/0031546 | A1 | 2/2011 | Uenaka |
| 2011/0060722 | A1 | 3/2011 | Li |
| 2011/0239083 | A1 | 9/2011 | Kanno |
| 2011/0252188 | A1 | 10/2011 | Weingarten |
| 2011/0289263 | A1 | 11/2011 | McWilliams |
| 2011/0289280 | A1 | 11/2011 | Koseki |
| 2011/0296411 | A1 | 12/2011 | Tang |
| 2011/0302408 | A1 | 12/2011 | McDermott |
| 2012/0017037 | A1 | 1/2012 | Riddle |
| 2012/0151253 | A1 | 6/2012 | Horn |
| 2012/0203958 | A1 | 8/2012 | Jones |
| 2012/0324312 | A1 | 12/2012 | Moyer |
| 2012/0331207 | A1 | 12/2012 | Lassa |
| 2013/0016970 | A1 | 1/2013 | Koka |
| 2013/0018852 | A1 | 1/2013 | Barton |
| 2013/0024605 | A1 | 1/2013 | Sharon |
| 2013/0138871 | A1 | 5/2013 | Chiu |
| 2013/0179898 | A1 | 7/2013 | Fang |
| 2013/0205183 | A1 | 8/2013 | Fillingim |
| 2013/0227347 | A1 | 8/2013 | Cho |
| 2013/0254622 | A1 | 9/2013 | Kanno |
| 2013/0329492 | A1 | 12/2013 | Yang |
| 2014/0082412 | A1 | 3/2014 | Matsumura |
| 2014/0095769 | A1 | 4/2014 | Borkenhagen |
| 2014/0108891 | A1 | 4/2014 | Strasser |
| 2014/0164447 | A1 | 6/2014 | Tarafdar |
| 2014/0164879 | A1 | 6/2014 | Tam |
| 2014/0215129 | A1 | 7/2014 | Kuzmin |
| 2014/0223079 | A1 | 8/2014 | Zhang |
| 2014/0379965 | A1* | 12/2014 | Gole ................... G06F 12/0802 |
| | | | 711/103 |
| 2015/0006792 | A1 | 1/2015 | Lee |
| 2015/0039849 | A1 | 2/2015 | Lewis |
| 2015/0143030 | A1 | 5/2015 | Gorobets |
| 2015/0186657 | A1 | 7/2015 | Nakhjiri |
| 2015/0199234 | A1 | 7/2015 | Choi |
| 2015/0286477 | A1 | 10/2015 | Mathur |
| 2015/0310916 | A1 | 10/2015 | Leem |
| 2015/0317095 | A1 | 11/2015 | Voigt |
| 2015/0341123 | A1 | 11/2015 | Nagarajan |
| 2015/0363328 | A1 | 12/2015 | Candelaria |
| 2016/0048327 | A1 | 2/2016 | Jayasena |
| 2016/0054922 | A1 | 2/2016 | Awasthi |
| 2016/0062885 | A1 | 3/2016 | Ryu |
| 2016/0077749 | A1 | 3/2016 | Ravimohan |
| 2016/0077764 | A1 | 3/2016 | Ori |
| 2016/0103631 | A1 | 4/2016 | Ke |
| 2016/0124742 | A1 | 5/2016 | Rangasamy |
| 2016/0132237 | A1 | 5/2016 | Jeong |
| 2016/0141047 | A1 | 5/2016 | Sehgal |
| 2016/0155750 | A1 | 6/2016 | Yasuda |
| 2016/0224267 | A1 | 8/2016 | Yang |
| 2016/0234297 | A1 | 8/2016 | Ambach |
| 2016/0306699 | A1 | 10/2016 | Resch |
| 2016/0321002 | A1 | 11/2016 | Jung |
| 2016/0335085 | A1 | 11/2016 | Scalabrino |
| 2016/0381442 | A1 | 12/2016 | Heanue |
| 2017/0004037 | A1 | 1/2017 | Park |
| 2017/0123655 | A1 | 5/2017 | Sinclair |
| 2017/0185498 | A1 | 6/2017 | Gao |
| 2017/0192848 | A1 | 7/2017 | Pamies-Juarez |
| 2017/0199823 | A1 | 7/2017 | Hayes |
| 2017/0242722 | A1 | 8/2017 | Qiu |
| 2017/0269998 | A1 | 9/2017 | Sunwoo |
| 2017/0279460 | A1 | 9/2017 | Camp |
| 2017/0322888 | A1 | 11/2017 | Booth |
| 2018/0067847 | A1 | 3/2018 | Oh |
| 2018/0069658 | A1 | 3/2018 | Benisty |
| 2018/0074730 | A1 | 3/2018 | Inoue |
| 2018/0076828 | A1 | 3/2018 | Kanno |
| 2018/0113631 | A1 | 4/2018 | Zhang |
| 2018/0165038 | A1 | 6/2018 | Authement |
| 2018/0165169 | A1 | 6/2018 | Camp |
| 2018/0165340 | A1 | 6/2018 | Agarwal |
| 2018/0173620 | A1 | 6/2018 | Cen |
| 2018/0188970 | A1 | 7/2018 | Liu |
| 2018/0189175 | A1 | 7/2018 | Ji |
| 2018/0219561 | A1 | 8/2018 | Litsyn |
| 2018/0226124 | A1 | 8/2018 | Perner |
| 2018/0260148 | A1 | 9/2018 | Klein |
| 2018/0321864 | A1 | 11/2018 | Benisty |
| 2018/0322024 | A1 | 11/2018 | Nagao |
| 2018/0357126 | A1 | 12/2018 | Dhuse |
| 2018/0373664 | A1 | 12/2018 | Vijayrao |
| 2019/0050327 | A1 | 2/2019 | Li |
| 2019/0065085 | A1 | 2/2019 | Jean |
| 2019/0073261 | A1 | 3/2019 | Halbert |
| 2019/0087089 | A1 | 3/2019 | Yoshida |
| 2019/0087115 | A1 | 3/2019 | Li |
| 2019/0087328 | A1 | 3/2019 | Kanno |
| 2019/0116127 | A1 | 4/2019 | Pismenny |
| 2019/0172820 | A1 | 6/2019 | Meyers |
| 2019/0196748 | A1 | 6/2019 | Badam |
| 2019/0196907 | A1 | 6/2019 | Khan |
| 2019/0212949 | A1 | 7/2019 | Pletka |
| 2019/0220392 | A1 | 7/2019 | Lin |
| 2019/0272242 | A1 | 9/2019 | Kachare |
| 2019/0278654 | A1 | 9/2019 | Kaynak |
| 2019/0317901 | A1 | 10/2019 | Kachare |
| 2020/0013458 | A1 | 1/2020 | Schreck |
| 2020/0042223 | A1 | 2/2020 | Li |
| 2020/0042387 | A1 | 2/2020 | Shani |
| 2020/0089430 | A1 | 3/2020 | Kanno |
| 2020/0143885 | A1 | 5/2020 | Kim |
| 2020/0159425 | A1 | 5/2020 | Flynn |
| 2020/0167091 | A1 | 5/2020 | Haridas |
| 2020/0210309 | A1 | 7/2020 | Jung |
| 2020/0218449 | A1* | 7/2020 | Leitao ................... G06F 3/0679 |
| 2020/0225875 | A1 | 7/2020 | Oh |
| 2020/0242021 | A1 | 7/2020 | Gholamipour |
| 2020/0250032 | A1 | 8/2020 | Goyal |
| 2020/0257598 | A1 | 8/2020 | Yazovitsky |
| 2020/0326855 | A1 | 10/2020 | Wu |
| 2020/0328192 | A1 | 10/2020 | Zaman |
| 2020/0348888 | A1 | 11/2020 | Kim |
| 2020/0387327 | A1 | 12/2020 | Hsieh |

(56) References Cited

U.S. PATENT DOCUMENTS

| | | |
|---|---|---|
| 2020/0401334 A1 | 12/2020 | Saxena |
| 2020/0409791 A1 | 12/2020 | Devriendt |
| 2021/0010338 A1 | 1/2021 | Santos |
| 2021/0089392 A1 | 3/2021 | Shirakawa |
| 2021/0103388 A1 | 4/2021 | Choi |
| 2021/0191635 A1 | 6/2021 | Hu |
| 2021/0286555 A1* | 9/2021 | Li ................... G06F 3/068 |

OTHER PUBLICATIONS

Po-Liang Wu, Yuan-Hao Chang and T. Kuo, "A file-system-aware FTL design for flash-memory storage systems," 2009, pp. 393-398.

S. Choudhuri and T. Givargis, "Preformance improvement of block based NAND flash translation layer", 2007 5th IEEE/ACM/IFIP International Conference on Hardware/Software Codesign and Systems Synthesis (CODES+ISSS). Saizburg, 2007, pp. 257-262.

A. Zuck, O. Kishon and S. Toledo. "LSDM: Improving the Preformance of Mobile Storage with a Log-Structured Address Remapping Device Driver", 2014 Eighth International Conference on Next Generation Mobile Apps, Services and Technologies, Oxford, 2014, pp. 221-228.

J. Jung and Y. Won, "nvramdisk: A Transactional Block Device Driver for Non-Volatile RAM", in IEEE Transactions on Computers, vol. 65, No. 2, pp. 589-600, Feb. 1, 2016.

Te I et al. (Pensieve: a Machine Assisted SSD Layer for Extending the Lifetime: (Year: 2018).

ARM ("Cortex-R5 and Cortex-R5F", Technical reference Manual, Revision r1p1) (Year:2011).

\* cited by examiner

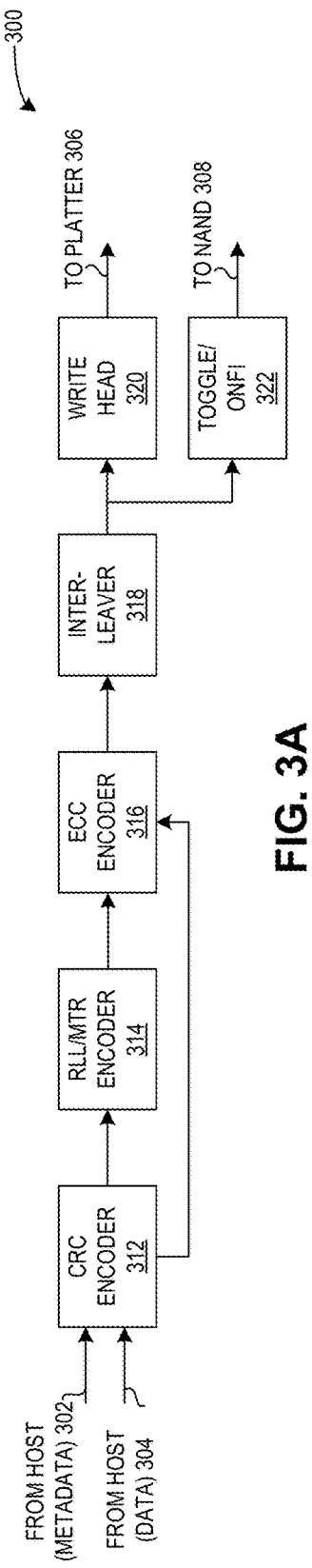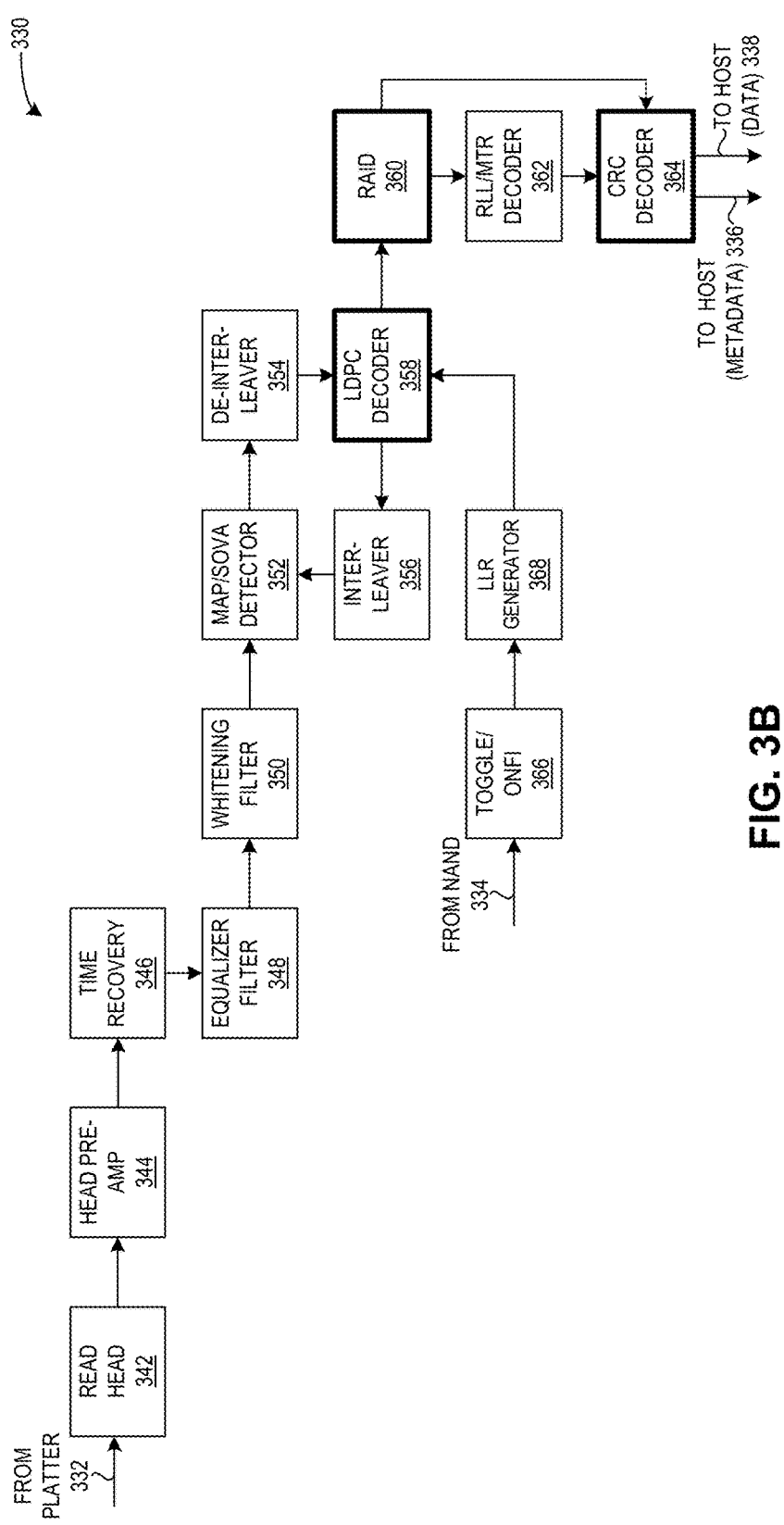
FIG. 3A
FIG. 3B

METHOD AND SYSTEM FOR ENHANCING IOPS OF A HARD DISK DRIVE SYSTEM BASED ON STORING METADATA IN HOST VOLATILE MEMORY AND DATA IN NON-VOLATILE MEMORY USING A SHARED CONTROLLER

BACKGROUND

Field

This disclosure is generally related to the field of data storage. More specifically, this disclosure is related to a method and system for enhancing the input/output per second (IOPS) of a hard disk drive (HDD) system based on host management and a shared controller.

Related Art

Today, various storage systems are being used to store and access the ever-increasing amount of digital content. A storage system can include storage servers with one or more storage devices or drives, and a storage device or drive can include storage media with a non-volatile memory (such as a solid state drive (SSD) or a hard disk drive (HDD)). In current SSDs, NAND flash memory is used in a broad manner to build SSDs which can serve as an alternative form of mass storage to HDDs. In general, SSDs can be fine-tuned to serve as a high-speed replacement for HDDs. As a result, both the high-throughput interfaces and the flash translation layer (FTL) continue to develop and become more complicated, e.g., to account for varying block sizes and access formats. This can result in compromises and sacrifices to the original capability of NAND flash.

At the same time, in current HDDs, a dilemma exists between, on the one hand, the increase of capacity of an HDD and, on the other hand, the restriction of the narrow range for the IOPS of a single HDD. As a result, challenges exist for new-generation HDDs in providing sufficient storage service (i.e., balancing both capacity and access latency). One challenge in access latency involves metadata access. A system may store metadata and data in different locations in an HDD. In order to execute an I/O operation, the HDD must access both the metadata and the data, which can involve moving the read head multiple times. As an example, one read operation may include several metadata accesses and a single data access.

Moreover, a gap can exist between the IOPS/GB from the HDD perspective and the application-measured or user-observed IOPS/GB. An application can measure the IOPS/GB based on an actual issued I/O. However, because a single issued I/O involves both metadata and data accesses, the HDD must consider all types of I/O together to provide the overall IOPS/GB performance, which can result in the gap between these two different IOPS/GB values. The challenges of both SSDs and HDDs can thus result in constraints which can limit the flexibility and performance of the overall storage system.

SUMMARY

One embodiment provides a system which facilitates operation of a storage system. During operation, the system receives, by a storage engine, a request to write data to a hard disk drive. The system determines metadata associated with the data. The system stores the metadata in a volatile memory associated with the storage engine. The system identifies a physical address in a first non-volatile solid-state memory to which to write the metadata, wherein the first non-volatile solid-state memory is accessible via a controller of the hard disk drive. The system writes the metadata to the first non-volatile solid-state memory based on the physical address. The system writes the data to the hard disk drive.

In some embodiments, the system determines that the metadata is an update to existing metadata stored in the storage engine. The system writes the updated metadata to the first non-volatile solid-state memory based on the identified physical address by appending the updated metadata at a next available location of the first non-volatile solid-state memory.

In some embodiments: a second non-volatile solid-state memory is accessible via the controller of the hard disk drive; the first non-volatile solid-state memory is a first NAND die and the second non-volatile solid-state memory is a second NAND die; and a NAND die includes at least two planes.

In some embodiments, the system determines that the first NAND die stores an amount of data which is greater than a first predetermined threshold. The system flushes metadata stored in the volatile memory of the storage engine to the second NAND die. The system writes updated metadata to the volatile memory of the storage engine. The system synchronizes the updated metadata by writing the updated metadata to the second NAND die. The system erases the data from the first NAND die.

In some embodiments, the metadata is stored in the volatile memory of the storage engine as a first entry based on a metadata index and a plurality of metadata content chunks. The metadata is written to the first non-volatile solid-state memory as a second entry corresponding to the first entry and further written sequentially to the first non-volatile solid-state memory based on the identified physical address at a next available location of the first non-volatile solid-state memory.

In some embodiments, the second entry includes: a NAND offset index which corresponds to the metadata index; a physical address for a corresponding metadata content chunk prior to a current update; and the corresponding metadata content chunk.

In some embodiments, the system detects an error associated with accessing the metadata stored in the volatile memory of the storage engine. The system reconstructs the metadata by: scanning, based on the metadata index, the first non-volatile solid-state memory to obtain the second entry and any other entries which include the metadata index; and selecting, from the second entry and the other entries, based on the prior physical address of the second entry or a respective prior physical address of the other entries, a third entry which corresponds to a most recent version of the metadata, wherein the reconstructed metadata comprises a corresponding metadata content chunk included in the third entry.

In some embodiments, the hard disk drive controller comprises one or more of: a cyclic redundancy check (CRC) encoder or decoder module; a run limited length/maximum transition run (RLL/MTR) encoder or decoder module; an error correction code (ECC) encoder or decoder module; a low-density parity-check (LDPC) encoder or decoder module; an interleaver or de-interleaver module; a log likelihood ratio (LLR) generator module; a redundant array of inter-dependent disks (RAID) management module; an interface to a write head or a read head; and a Toggle/Open NAND Flash Interface (ONFI).

In some embodiments, the system receives a request to read the data from the hard disk drive. In response to successfully obtaining the associated metadata from the volatile memory of the storage engine, the system obtains the requested data from the hard disk drive based on the associated metadata. In response to unsuccessfully obtaining the associated metadata from the volatile memory of the storage engine, the system obtains the associated metadata from the first non-volatile solid-state memory.

In some embodiments, obtaining the associated metadata from the first non-volatile solid-state memory involves operations by one or more of: the Toggle/ONFI; the LLR generator module; the ECC or LDPC encoder or decoder module; the RAID module; and the CRC encoder or decoder module.

BRIEF DESCRIPTION OF THE FIGURES

FIG. 3A depicts an exemplary write path in an HDD controller, in accordance with an embodiment of the present application.

FIG. 3B depicts an exemplary read path in an HDD controller, in accordance with an embodiment of the present application.

In the figures, like reference numerals refer to the same figure elements.

DETAILED DESCRIPTION

Figure 1:
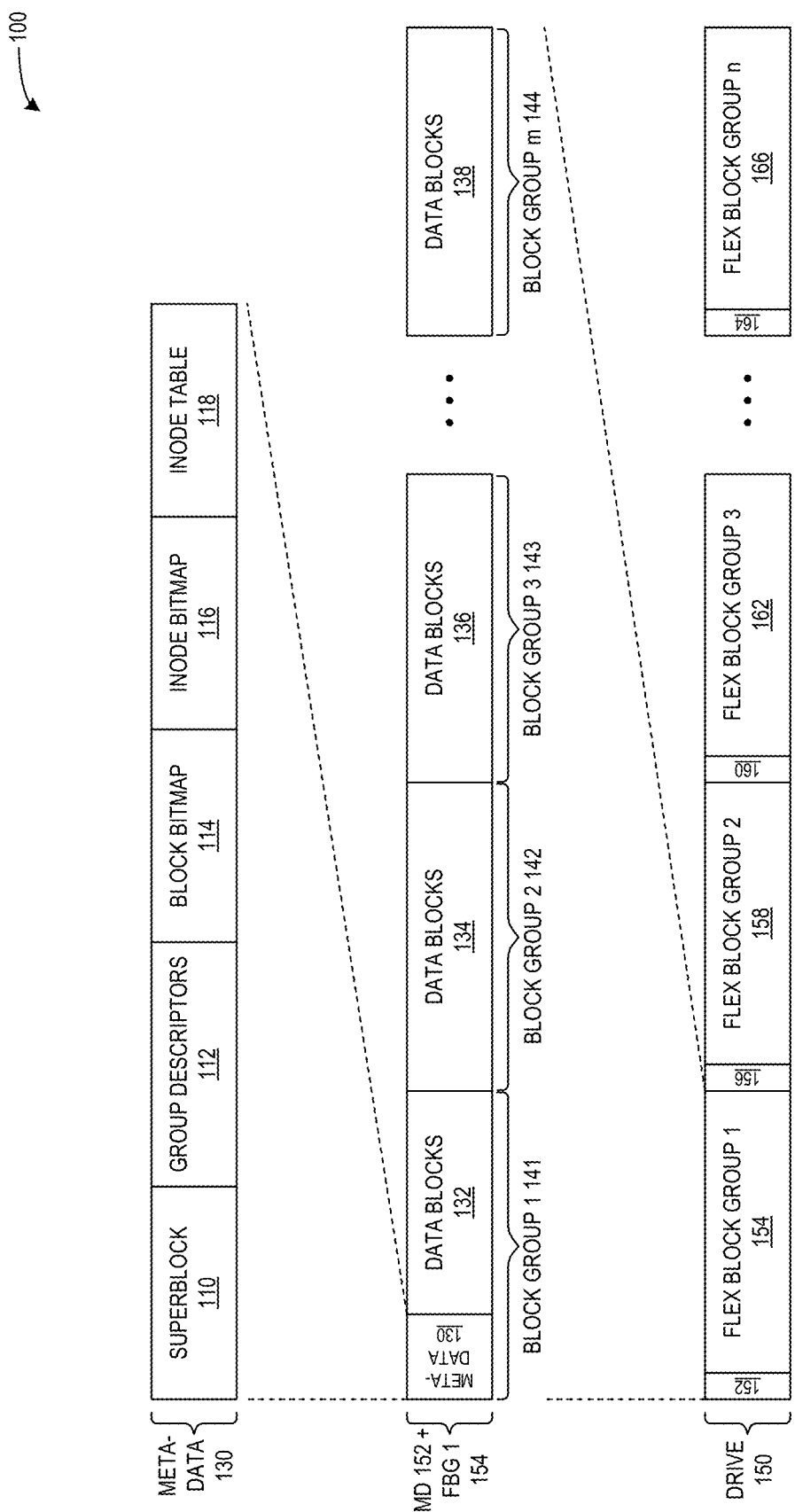
FIG. 1 illustrates an exemplary environment which facilitates operation of a storage system, in accordance with the prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein facilitate a hard disk drive system which collaborates with a local storage engine to improve the IOPS/GB of a high-capacity HDD, by: integrating NAND dies into the HDD to store metadata; modifying the HDD controller to provide access to/from both the HDD (for the data) and the NAND dies (for the metadata); storing updates to the metadata in the system memory; and synchronizing the backup of a snapshot flush for erasing data stored in the NAND dies.

As described above, in current SSDs, both the high-throughput interfaces and the flash translation layer (FTL) continue to develop and become more complicated, e.g., to account for varying block sizes and access formats. This can result in compromises and sacrifices to the original capability of NAND flash. At the same time, in current HDDs, a dilemma exists between, on the one hand, the increase of the capacity of an HDD and, on the other hand, the restriction of the narrow range for the IOPS of a single HDD. For example, in order to maintain a certain IOPS/GB criteria, a 4 Terabyte (TB) HDD must be used even though the current capacity of HDDs can be in the 14-16 TB range. Prior generations of HDDs are also approaching end-of-life (EOL). As a result, the pressure related to costs and supply chain issues continue to grow at an accelerated pace, and challenges exist for new-generation HDDs in providing sufficient storage service (i.e., balancing both capacity and access latency).

One challenge in access latency in HDDs involves metadata access. A system may store metadata and data in different locations in an HDD. In order to execute an I/O operation, the HDD must access both the meta-data and the data, which can involve moving the read head multiple times, as described below in relation to FIG. 1. As an example, one read operation may include several metadata accesses and a single data access.

Moreover, a gap can exist between the IOPS/GB from the HDD perspective and the application-measured or user-observed IOPS/GB. An application can measure the IOPS/GB based on an actual issued I/O. However, because a single issued I/O involves both metadata and data accesses, the HDD must consider all types of I/O together to provide the overall IOPS/GB performance, which can result in the gap between these two different IOPS/GB values. Random read scenarios in particular can result in a very constrained HDD performance, as the read head must move to make several metadata accesses and a data access in a single read operation.

While certain techniques have been applied to improve the write performance (e.g., by inserting an SSD write cache), the performance of a random read can still suffer in a current HDD system. The challenges described above of both SSDs and HDDs can thus result in constraints which can limit the flexibility and performance of the overall storage system.

The embodiments described herein address these challenges by providing a hard disk drive system which uses a local storage engine and a modified hard disk drive controller which can interface with both the HDD storage media (e.g., platters) and the integrated flash memory (e.g., NAND dies). The local storage engine can manage the metadata and the data, e.g., by receiving data from applications, and by organizing and generating the corresponding metadata. The local storage engine can initiate a write request by sending, via the modified HDD controller, the metadata to the NAND dies, by using and operating on the physical addresses of the NAND dies. The local storage engine can also send, via the modified HDD controller, the data to be written to the HDD platters/tracks. The storage engine can maintain the most recent metadata in its host memory (i.e., system memory), and the system can synchronize the latest metadata from the host memory to the persistent storage of the NAND dies, as described below in relation to FIGS. 2, 4, and 6. In the event of an error, the system can use the persistently stored metadata in the NAND dies to perform a reconstruction or rebuilding process to recover the mapping structure and other information needed to rebuild the metadata, as described below in relation to FIGS. 4 and 6.

The system can update the metadata stored in the system memory by using an in-place overwrite, and can also update the metadata stored in the NAND dies in a sequential, append-only manner, as described below in relation to FIG. 4. Furthermore, the integrated NAND flash memory can be "simplified" or light-weight, in that the NAND is not a general purpose SSD and does not provide the conventional SSD features (e.g., garbage collection, wear leveling, data refreshing, and address mapping), as described below in relation to FIG. 5. The system can use a pair of multi-plane NAND dies to implement a switching mechanism for erasing data from one NAND die of the pair of NAND dies, as described below in relation to FIG. 6.

Thus, by isolating the metadata from the data through the host memory and the integrated NAND flash in a hard disk drive system, the embodiments described herein provide a system which can allocate and optimize the IOPS capability for data access from an HDD. This isolation of the metadata from the data allows the system to remove the metadata IOPS consumption from the HDD, which can enhance the available IOPS capability of a high-capacity HDD as used by applications, which in turn can enable the high-capacity HDD to meet certain deployment requirements of the applications. Furthermore, a host, host application, or other application can manage the physical addresses of metadata stored in the NAND dies, where the NAND dies support only sequential write capabilities. The system can use the switching/flushing mechanism for erasing the NAND dies. The system can also provide a modified HDD controller which interfaces with both the HDD and the NAND flash. As a result, the embodiments described herein provide an improved hard disk drive system which can use high-capacity HDDs with an enhanced IOPS, which in turn can result in a more efficient overall storage system.

A "distributed storage system" or a "storage system" can include multiple storage servers. A "storage server" or a "storage system" can refer to a computing device which can include multiple storage devices or storage drives. A "storage device" or a "storage drive" refers to a device or a drive with a non-volatile memory which can provide persistent storage of data, e.g., a solid state drive (SSD), a hard disk drive (HDD), or a flash-based storage device. A storage system can also be a computer system.

A "computing device" refers to any server, device, node, entity, drive, or any other entity which can provide any computing capabilities.

The terms "local storage engine," "storage engine," and "host processor" refer to a unit, module, CPU, processor, software, or firmware which can perform the operations described herein, e.g., relating to: organizing, generating, storing, and updating metadata; determining a physical address in the NAND dies to which to write metadata; managing the access of the data itself to/from the HDD.

The terms "HDD controller" and "modified HDD controller" refer to a controller unit or module associated with the platters/tracks of an HDD and also associated with integrated NAND dies. That is, both the HDD platters and the NAND dies are accessible via the HDD controller. The HDD controller can include interfaces to both the HDD platters and the NAND dies, as described below in relation to FIG. 2. In some embodiments, the NAND dies can be integrated with or embedded on the hard disk drive.

The term "hard disk drive system" refers to a system which can store data on at least a hard disk drive. In this disclosure, the described HDD system includes a storage engine which communicates with an HDD controller, as described below in relation to FIGS. 2 and 5.

Exemplary Operation of a Storage System in the Prior Art

One challenge in access latency in HDDs involves metadata access. A system may store metadata and data in different locations in an HDD, and in order to execute an I/O operation, the HDD must access both the meta-data and the data. This can involve moving the read head multiple times. To reduce the time and distance involved in moving the head, an HDD can use a conventional file system (such as a fourth extended file system or "ext4") which divides the physical regions of the HDD into block groups. Each block group can maintain its own metadata at the beginning of its physical region. As a result, in order to execute the I/O operation, the system first accesses the metadata, and subsequently, the current position of the head may end up close to the data itself, which may reduce the latency and improve the performance. This conventional system is described below in relation to FIG. 1.

FIG. 1 illustrates an exemplary environment 100 which facilitates operation of a storage system, in accordance with the prior art. Environment 100 can include a drive 150 (such as a hard disk drive), which is an ext4 file system. Ext4 uses flexible block groups, e.g., by grouping several block groups together as a single logical block group. The bitmap space and inode table space in the first block group of a flexible block group can be expanded to include the bitmaps and inodes tables of all other block groups in the flexible block group. For example, drive 150 can be logically divided into a flexible block group 1 154, a flexible block group 2 158, a flexible block group 3 162, and a flexible block group n 166. Each flexible block group can include associated metadata, respectively, metadata 152, 156, 160, and 164.

As an example, metadata 152 and flexible block group 1 154 can include metadata 130 and a plurality of data blocks 132, 134, 136, and 138. Metadata 130 and data blocks 132 can correspond to a block group 1 141; data blocks 134 can correspond to a block group 2 142; data blocks 136 can correspond to a block group 3 143; and data blocks 138 can correspond to a block group m 144. Metadata 130 can include: a superblock 110; group descriptors 112; a block bitmap 114; an inode bitmap 116; and an inode table 118.

While dividing the physical regions of the HDD into block groups can improve the performance in some areas, the challenge still exists of the gap between the IOPS/GB from the HDD perspective and the application-measured or user-observed IOPS/GB. As described above, random read scenarios in particular can result in a very constrained HDD performance, as the read head must move to make several metadata accesses and a data access in a single read operation. These constraints can limit the flexibility and performance of the overall storage system.

Figure 2:
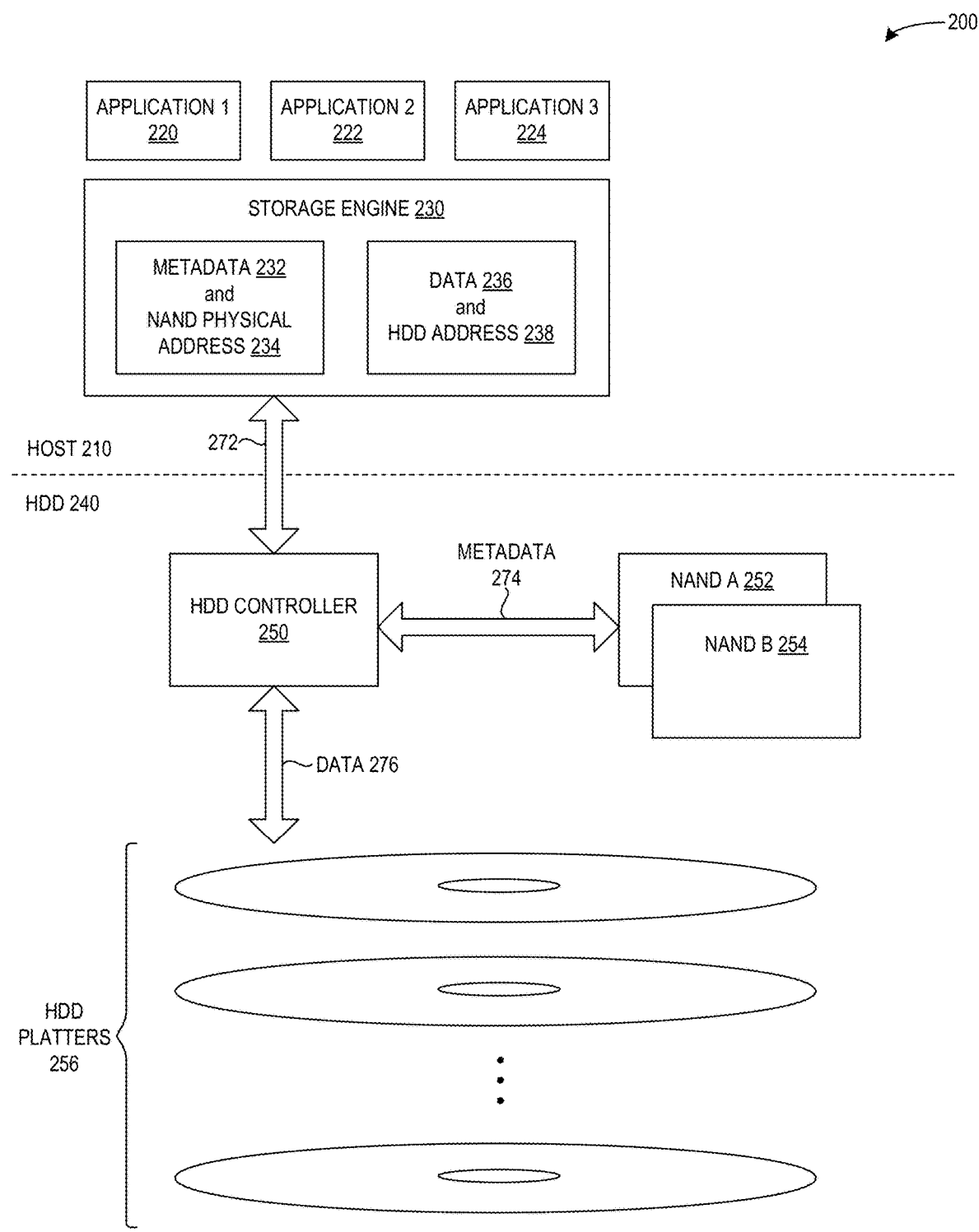
FIG. 2 illustrates an exemplary environment which facilitates operation of a storage system, including a storage engine (for handling metadata and data) and a modified HDD controller, in accordance with an embodiment of the present application.

Exemplary Operation of a Storage System with Isolation of Metadata and Data and a Modified HDD Controller The embodiments described herein provide a system which addresses the challenges described above in relation to prior art environment 100 of FIG. 1. FIG. 2 illustrates an exemplary environment 200 which facilitates operation of a storage system, including a storage engine 230 (for handling metadata and data) and a modified HDD controller 250, in accordance with an embodiment of the present application. Environment 200 can include a host 210 and an HDD 240. Host 210 can include a storage engine 230 which communicates with multiple applications (such as 220, 222, and 224). HDD 240 can include an HDD controller 250, with interfaces to both HDD platters 256 and a "data bucket." The data bucket can be a non-volatile solid-state memory, such as a NAND die. In FIG. 2, the data bucket is depicted as a pair of NAND dies: a NAND A 252 and a NAND B 254. The interfaces in HDD controller 250 allow both HDD platters 256 and NAND dies 252 and 254 to be accessible to HDD controller 250. In some embodiments, the NAND dies are co-located with or in close physical proximity to the HDD platters (e.g., embedded or integrated into HDD 240).

During operation, storage engine 230 can receive, from one of applications 220-224, a request to write data to a hard disk drive. Storage engine 230 can determine metadata 232 associated with the data, and can also identify a physical address (e.g., a NAND physical address 234) in a first non-volatile solid-state memory to which to write the metadata. The NAND physical address can be written as a NAND offset and stored in a metadata index table, as described below in relation to FIG. 4. Storage engine 230 can store, in a volatile memory of storage engine 230 (such as system memory or DRAM): metadata 232 and NAND physical address 234; and data 236 and a determined HDD address 238.

Storage engine 230 can send both metadata 232 and data 236 (via a communication 272) to HDD controller 250. HDD controller can send metadata 232 (as metadata 274) to be written at NAND physical address 234 in one of NAND A 252 and NAND B 254. HDD controller 250 can also send data 236 (as data 276) to be written at HDD address 238 of HDD platters 256.

Environment 200 thus depicts how a storage engine can operate the physical address of NAND flash by initiating the write request of metadata into one NAND die of the pair of NAND dies, and further depicts how the storage engine can send the data to be written to the appropriate tracks of the platters of the HDD. The system can store the most recent version of metadata in host memory, and can synchronize this most recent version for persistent storage into the NAND die. In the scenario of normal usage or operation, the system can persistently store this most recent version of metadata in the NAND die without needing to read this most recent version of metadata. If the system detects a failure or an error associated with accessing the metadata stored in the host memory, the system can reconstruct or rebuild the metadata by using the persistently stored most recent version of metadata stored in the NAND die, as described below in relation to FIGS. 4, 5, and 7C.

By allowing a normal read operation to retrieve metadata directly from the system memory, rather than from the HDD media as described above in the prior art environment of FIG. 1, the embodiments described herein can provide a significant savings in the I/O resources spent on accessing metadata, which can result in the allocation of an increased amount of IOPS to execute read and write operations of data. This can result in an improvement in the IOPS of greater than 100%, especially in the metadata. Furthermore, depending on how many metadata accesses (or queries) are required for a single data access, an application may observe an improvement in IOPS capability on the order of many folds. This is especially true given a conventional file system which maintains a deep hierarchy, because decreasing the metadata access in such a deep system can result in significant savings in I/O resources, which resources can be allocated to execute read and write operations of data.

Exemplary Write and Read Paths

The embodiments described herein provide a modified HDD controller, which can accommodate the different physical characteristics and features of magnetic media (e.g., in an HDD) and NAND flash (e.g., the previously described data buckets or NAND dies).

FIG. 3A depicts an exemplary write path 300 in an HDD controller, in accordance with an embodiment of the present application. During operation, the system can receive metadata from a host (via a communication 302). Cyclic redundancy check (CRC) encoder module 312 can perform a CRC and send the CRC-encoded metadata directly to an error correction code (ECC) encoder module 316. ECC encoder module 316 can perform an error correction code encoding on the metadata, and send the ECC-encoded metadata to an interleaver module 318. Interleaver module 318 can perform an interleaving on the metadata, and send the interleaved metadata via a toggle/Open NAND Flash Interface (ONFI) to a non-volatile solid-state memory (via a to NAND communication 308).

As part of the write operation, the system can also receive data from the host (via a communication 304). CRC encoder module 312 can perform a CRC and send the CRC-encoded data to a run length limited/maximum transition run (RLL/MTR) encoder 314, which can be a source encoder that enlarges the signal entropy at the transmitter. RLL/MTR encoder 314 can send the encoded data to ECC encoder module 316. ECC encoder module 316 can perform an error correction code encoding on the data, and send the ECC-encoded data to interleaver module 318. Interleaver module 318 can perform an interleaving on the data, and send the interleaved data via a write head 320 to be written to a platter of a hard disk drive (via a to platter communication 306).

FIG. 3B depicts an exemplary read path 330 in an HDD controller, in accordance with an embodiment of the present application. During operation, the system can retrieve metadata from NAND (via a communication 334) through a toggle/ONFI 366. The system can send the retrieved metadata to a log likelihood ratio (LLR) generator module 368, which can further process the data and send the processed data to a low-density parity-check (LDPC) decoder 358. LDPC decoder module 358 can perform an ECC decoding operation, and send the ECC-decoded metadata to RAID module 360. In certain cases (e.g., detecting an error associated with the ECC-decoded metadata), LDPC decoder module 358 can send the ECC-decoded metadata to an interleaver module 356. Interleaver module 356 can perform an interleaving on the ECC-decoded metadata and send the interleaved metadata to a mapping/soft-output Viterbi algorithm (map/S OVA) detector module 352 to repeat the below-described process. RAID 360 can perform any known RAID storage techniques, and send the further processed metadata to CRC decoder module 364. CRC decoder module 364 can further decode the metadata based on a CRC, and return the decoded metadata to the host (via a to host communication 336).

As part of the read operation, the system can also retrieve data from a read head 342 (via a from platter communication 332). The system can send the data through several modules for processing, including: a head pre-amplifier module 344; a time recovery module 346; an equalizer/filter module 348; a whitening filter module 350; and map/SOVA) detector module 352. The system is sent to a de-interleaver module 354, which can de-interleave the processed data and send the data to an ECC decoder, such as LDPC decoder module 358. LDPC decoder module 358 can perform an ECC decoding operation, and send the ECC-decoded data to a redundant array of independent disks (RAID) module 360. If an error is detected with the ECC-decoded data, LDPC decoder module 358 can send the ECC-decoded data to interleaver module 356, which can perform an interleaving on the ECC-decoded metadata and send the interleaved metadata to map/soya detector module 352 to repeat the above-described operations. RAID 360 can perform any known RAID storage techniques, and send the further processed data to RLL/MTR decoder module 362. RLL/MTR decoder module 362 can decode the data, and send the decoded data to a CRC decoder module 364. CRC decoder module 364 can further decode the data based on a CRC, and return the decoded data to the host (via a to host communication 338).

Thus, in the embodiments described herein, the HDD controller can be modified such that certain modules are shared between the two different types of physical media (as depicted with the bold outlined boxes in FIG. 3B): the ECC decoder (e.g., LDPC decoder 358); RAID 360; and CRC decoder 364. In some embodiments, the system can embed the NAND flash into the HDD by modifying the HDD controller to support the access from/to (i.e., read/write) the NAND flash, including by: sharing the ECC codec (i.e., ECC encoder 316 and LDPC decoder 358); sharing the CRC codec (i.e., CRC encoder 312 and CRC decoder 364); and adding the NAND interface (i.e., toggle/ONFIs 322 and 366). Furthermore, note that the metadata bypasses RLL/MTR encoder module 314 in the write path, and also bypasses RLL/MTR decoder module 362 in the read path.

The NAND flash depicted in FIGS. 3A and 3B represent data buckets, which can persistently store data in a sequential manner and can be accessed in the manner described herein. These NAND flash differ significantly from the NAND flash memory of a conventional SSD, as depicted below in relation to FIG. 5 (depicting various conventional features which are not supported by the data buckets of the described embodiments).

Organizing Metadata in System Memory and NAND Flash

Figure 4:
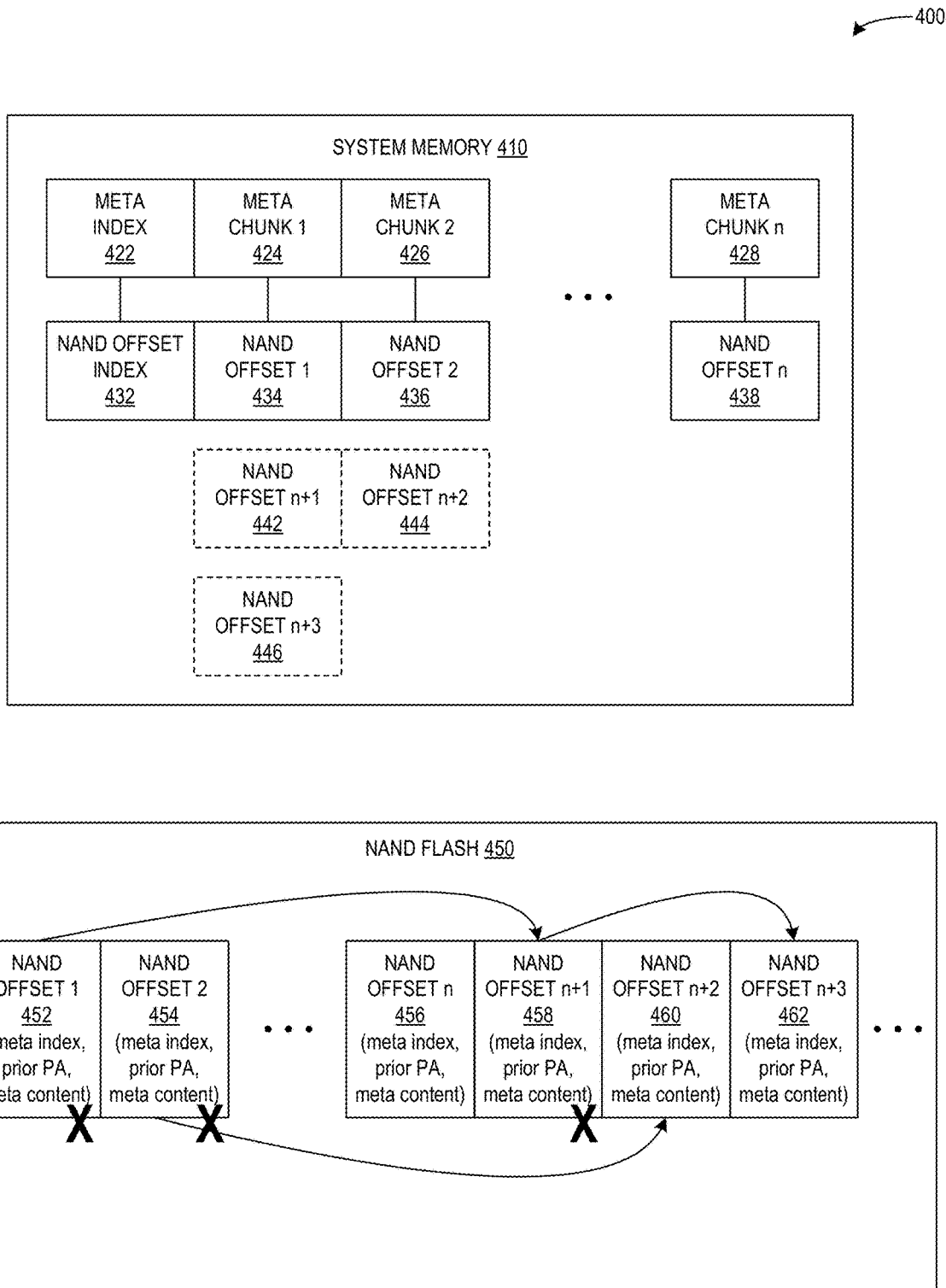
FIG. 4 depicts an exemplary environment for organizing metadata in a system memory and NAND flash, in accordance with an embodiment of the present application.

FIG. 4 depicts an exemplary environment 400 for organizing metadata in a system memory 410 and NAND flash 450, in accordance with an embodiment of the present application. During operation, when a data chunk is generated or updated, the system can write the data to an HDD platter (not shown), and can update the corresponding metadata with an in-place overwrite in system memory 410. The system can also synchronize the (updated) metadata into NAND flash 450. That is, the system can determine a physical address in NAND flash to which to write the metadata, and, based on the determined physical address, append the updated metadata at a next available location of the NAND flash.

The system can map a metadata index 422 to a plurality of metadata content chunks (such as metadata chunk 1 424, metadata chunk 2 426, and metadata chunk n 428). That is, the system can store the metadata in system memory 410 as a first entry based on a metadata index (e.g., 422) and a plurality of metadata content chunks (e.g., 424-428). Each metadata index can be paired with a NAND offset index which corresponds to a respective metadata index. For example, metadata index 422 can correspond to NAND offset index 432. During the write operation to NAND flash 450, the metadata (or updated metadata) is written as a second entry in NAND flash 450, in a sequential append-only manner, based on the NAND offset index. The second entry can include: the metadata index; the prior physical address before the current update; and the metadata content chunk. This entry (and its constituent elements) can form an atomic capsule which the system can log into NAND flash 450 as part of synchronizing and updating the metadata.

As described above, during normal operation, the system can persistently store the most recent version of metadata in the NAND die without needing to read the most recent version of metadata. However, if the system detects a failure or an error associated with accessing the metadata stored in the host memory, the system can reconstruct or rebuild the metadata by: scanning, based on a given metadata index, NAND flash 450 to obtain any entries which include the given metadata index; selecting, from those entries, the most recent version of the metadata, by using the prior physical address field of each scanned matching entry, to obtain a third entry; and using the corresponding metadata content chunk included in the obtained third entry to rebuild the necessary metadata. The prior physical address field can be used to distinguish between versions of metadata for a same metadata index.

For example, in FIG. 4, system memory 410 can store metadata corresponding to metadata index 422 (and NAND offset index 432), e.g.: metadata content chunk 1 424 can correspond to a NAND offset 1 434; metadata content chunk 2 426 can correspond to a NAND offset 2 436; and metadata content chunk n 428 can correspond to a NAND offset n 438. To initially synchronize or write the metadata in NAND flash 450, the system can sequentially write to NAND flash 450, at a next available location: an entry for a NAND offset 1 452, which includes the metadata index 422, the prior physical address, and the metadata content chunk 1 424; an entry for a NAND offset 2 454, which includes the metadata index 422, the prior physical address, and the metadata content chunk 2 426; and an entry for a NAND offset n 456, which includes the metadata index 422, the prior physical address, and the metadata content chunk n 428.

When the system receives an update to the metadata corresponding to metadata index 422, the system can execute an in-place overwrite in system memory 410, and synchronize the most recent update to NAND flash 450 as described herein. For example, the system can determine that a given metadata is an update to existing metadata stored in system memory 410. The system can overwrite existing metadata content chunk 1 424 with the updated metadata, and can correspondingly synchronize this updated metadata to NAND flash 450 by appending an entry for a NAND offset n+1 458 (which physical address is determined by the host as NAND offset n+1 442). Entry 458 can include: the metadata index 422; the prior physical address (i.e., the physical address at which previous entry 452 is stored, which corresponds to NAND offset 1 434); and the updated metadata for metadata content chunk 1 424. Appending entry 458 thus invalidates entry 452 at the prior physical address (indicated by a bold X in entry 452).

Similarly, given a metadata update to metadata content chunk 2 426, the system can overwrite existing metadata content chunk 2 426 with the updated metadata, and can correspondingly synchronize this updated metadata to NAND flash 450 by appending an entry for a NAND offset n+2 460 (which physical address is determined by the host as NAND offset n+2 444). Entry 460 can include: the metadata index 422; the prior physical address (i.e., the physical address at which previous entry 454 is stored, which corresponds to NAND offset 2 436); and the updated metadata for metadata content chunk 2 426. Appending entry 460 thus invalidates entry 454 at the prior physical address (indicated by a bold X in entry 454).

Furthermore, given a second update to metadata content chunk 1 424, the system can overwrite the current version of metadata content chunk 1 424, can correspondingly synchronize this updated metadata to NAND flash 450 by appending an entry for a NAND offset n+3 462 (which physical address is determined by the host as NAND offset n+3 446). Entry 462 can include: the metadata index 422; the prior physical address (i.e., the physical address at which previous entry 458 is stored, which corresponds to NAND offset n+3 446); and the updated metadata for metadata content chunk 1 424. Appending entry 462 thus invalidates entry 458 at the prior physical address (indicated by a bold X in entry 458).

Thus, environment 400 depicts how the system overwrites existing metadata with updated metadata in system memory 410, identifies the new physical address at which to synchronize/write the update in NAND flash 450, and persistently stores the updated metadata in an append-only manner in NAND flash 450, where each metadata entry is concatenated to the prior entry at a next available location of NAND flash 450. By using the prior physical address to determine the most recent version of metadata for a given metadata index, the system allows an efficient reconstruction of the metadata based on the mapping of valid metadata content chunks with the metadata index (e.g., as described above for entries 452-462 of NAND flash 450).

Exemplary "Simplified" NAND Flash

Figure 5:
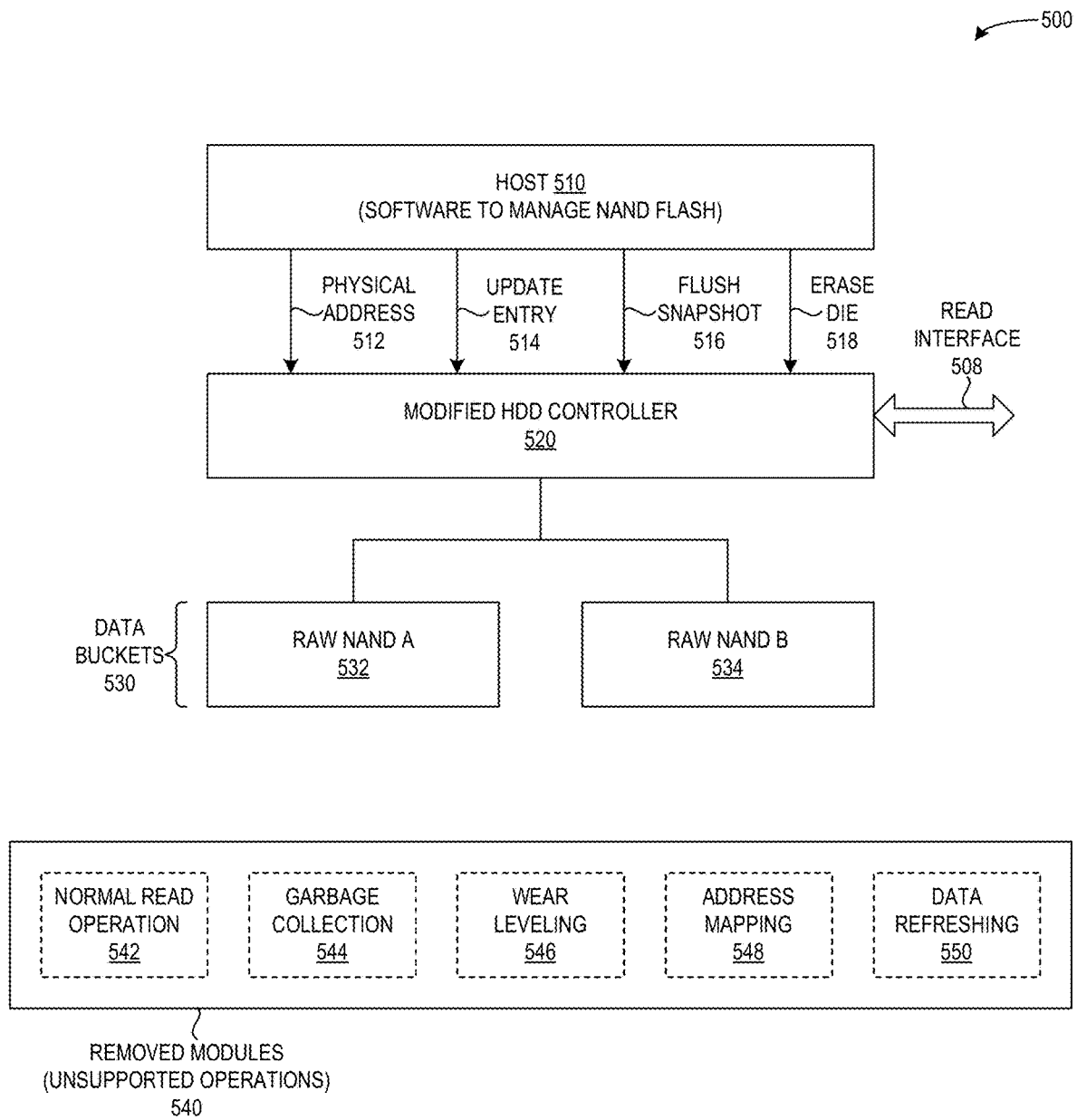
FIG. 5 depicts a simplified NAND flash as integrated into a hard disk drive system, in accordance with an embodiment of the present application.

As described herein, the embedded or included NAND flash of the HDD is not the same as the NAND flash of a general-purpose or conventional SSD. FIG. 5 depicts a simplified NAND flash as integrated into a hard disk drive system 500, in accordance with an embodiment of the present application. System 500 can include a host 510, which can include software to manage NAND flash. Host 510 can provide several types of operations, instructions, data, or communications to a modified HDD controller 520 (which can correspond to HDD controller 250 of FIG. 2). Exemplary operations can include: determining and sending a physical address 512; initiating an update entry 514 operation; performing a flush snapshot operation 516 (as described below in relation to FIG. 6); and initiating an erase die operation 518 (as described below in relation to FIG. 6).

HDD controller 520 can communicate with the physical platters (not shown) of a hard disk drive via a read interface 508 (such as a read head, and which can also be a write interface or a head). HDD controller 520 can also communicate with a pair of NAND dies (i.e., a raw NAND A 532 and a raw NAND B 534), via, e.g., a toggle/ONFI (not shown). These two NAND dies 532 and 534 can perform switching and erasing. That is, the system can determine that one NAND die stores an amount of data which is greater than a first predetermined threshold (i.e., when one NAND die is almost fully written or at a certain percentage of capacity), and the system can subsequently perform a switching/flushing/erasing operation. The physical address can be assigned by a host application, which can operate the NAND flash directly in the manner described herein.

These NAND dies are depicted as "raw" because they serve as data buckets 530, which store metadata in the append-only manner described above in relation to FIG. 4. For example, NAND dies 532 and 534 do not include any of the following functionality of a conventional NAND flash-based SSD, as depicted by the dashed boxed lines of removed modules (unsupported operations) 540: a normal read operation 542; a garbage collection module 544; a wear leveling module 546; an address mapping module 548; and a data refreshing module 550. Thus, by removing these general flash translation layer (FTL) operations and other internal operations from the NAND dies, the embodiments described herein provide a simplified raw NAND die which can be embedded or integrated into an HDD system (e.g., via an interface accessible from the same HDD controller).

Switching Mechanism for Erasing Data from NAND Dies

The switching/flushing/erasing operation can occur as follows: When a first die is almost full (e.g., determined to be store an amount of data greater than a first predetermined threshold), the system can flush the current metadata from the system memory into another "destination" NAND die, and can also write any subsequent metadata updates to the destination NAND die. When the system finishes flushing the current metadata from the system memory to the destination NAND die and when any metadata entry updates are written without error, the system can erase the first NAND die. Upon successfully erasing all the data in the first NAND die, the system can set the first NAND die to stand by as the next destination die, e.g., at the next switching/flushing/erasing operation when the current destination NAND die is determined to store an amount of data greater than a certain threshold (which can be the same as or different from the first predetermined threshold).

Figure 6:
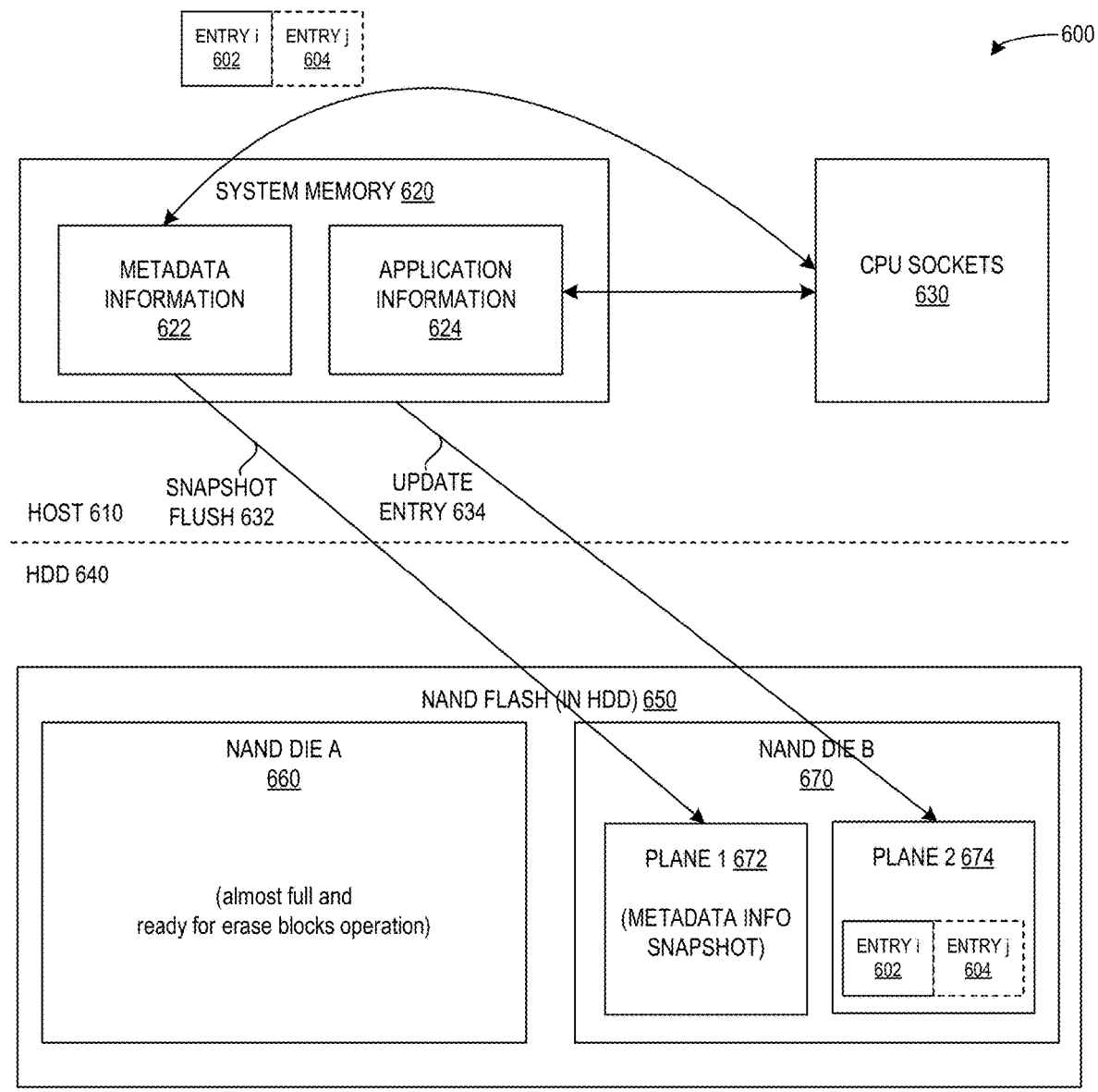
FIG. 6 depicts an exemplary environment for erasing data using at least a pair of multi-plane NAND dies, in accordance with an embodiment of the present application.

FIG. 6 depicts an exemplary environment 600 for erasing data using at least a pair of multi-plane NAND dies, in accordance with an embodiment of the present application. Environment 600 depicts a host 610 and a hard disk drive (HDD) 640. Host 610 can include a system memory 620 and CPU sockets 630. CPU sockets 630 can communicate with system memory 620 to store metadata information 622 and application information 624. HDD 640 can include HDD platters (not shown here, but similar to HDD platters 256 of FIG. 2) and NAND flash (in HDD) 650, e.g., as embedded or integrated NAND flash memory. NAND flash 650 can include a pair of NAND dies: a NAND die A 660, and a NAND die B 670. Each NAND die can include at least two planes or multiple planes (such as 2-plane, 4-plane, etc). For example, NAND die B 670 can include a plane 1 672 and a plane 2 674.

During operation, the system can determine that NAND die A 660 is almost full and ready for an erase blocks operation, i.e., that NAND die A 660 stores an amount of data which is greater than a first predetermined threshold. The system can perform a snapshot flush 632 operation, and copy metadata information 622 to plane 1 672 ("a first plane") of NAND die B 670. The system can also perform an update entry 634 operation, and write any metadata entry updates to plane 2 674 ("a second plane") of NAND die B 670. For example, upon initiating the switching/flushing/erasing mechanism described herein, if the update entry includes both an entry i 602 and an entry j 604 (one or both of which may be received by system memory 620 subsequent to the determination that NAND die A 660 is almost full), the system can write both of entries 602 and 604 to the second plane (i.e., plane 2 674) of NAND die B 670. The system can then erase all the blocks (i.e., data) in NAND die A 660, and set NAND die A to stand by as the next "destination die," as described above. In some embodiments, the system can assign snapshot flush 632 to the first plane, and can assign update entry 634 to the second plane.

Thus, the embodiments described herein provide a switching/flushing/erasing mechanism which results in a peer-to-peer backup of the metadata in stored in the NAND flash dies as part of an erase operation. This can result a more efficient handling of the sequential read and erase of NAND dies by the revised HDD controller.

Method for Facilitating Operation of a Storage System

Figure 7A:
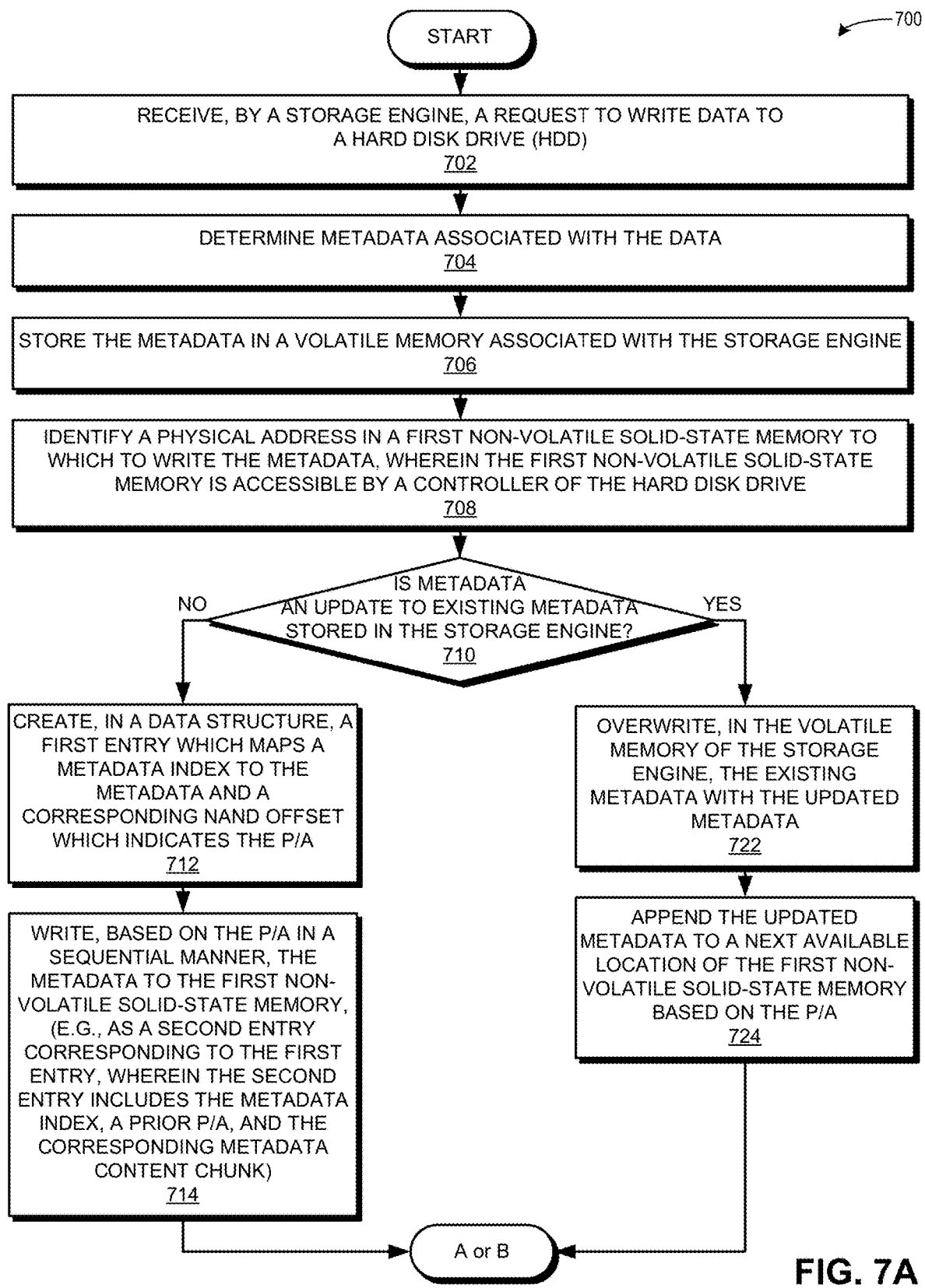
FIG. 7A presents a flowchart illustrating a method for facilitating operation of a storage system, in accordance with an embodiment of the present application.

FIG. 7A presents a flowchart 700 illustrating a method for facilitating operation of a storage system, in accordance with an embodiment of the present application. During operation, the system receives, by a storage engine, a request to write data to a hard disk drive (operation 702). The system determines metadata associated with the data (operation 704). The system stores the metadata in a volatile memory associated with the storage engine (operation 706). The system identifies a physical address in a first non-volatile solid-state memory to which to write the metadata, wherein the first non-volatile memory is accessible via a controller of the hard disk drive (operation 708).

If the metadata is not an update to existing metadata stored in the storage engine (decision 710), the system creates, in a data structure, a first entry which maps a metadata index to the metadata and a corresponding NAND offset which indicates the physical address (operation 712). The system writes, based on the physical address in a sequential manner, the metadata to the first non-volatile solid-state memory (e.g., as a second entry corresponding to the first entry, wherein the second entry includes the metadata index, a prior physical address, and the corresponding metadata content chunk) (operation 714). The system also writes the data to the hard disk drive (not shown). The operation continues at either Label A of FIG. 7B or Label B of FIG. 7C.

If the metadata is an update to existing metadata stored in the storage engine (decision 710), the system overwrites, in the volatile memory of the storage engine, the existing data with the updated metadata (operation 722). The system appends the updated metadata to a next available location of the first non-volatile solid-state memory based on the physical address (operation 724). The system also writes the data to the hard disk drive (not shown). The operation continues at either Label A of FIG. 7B or Label B of FIG. 7C.

Figure 7B:
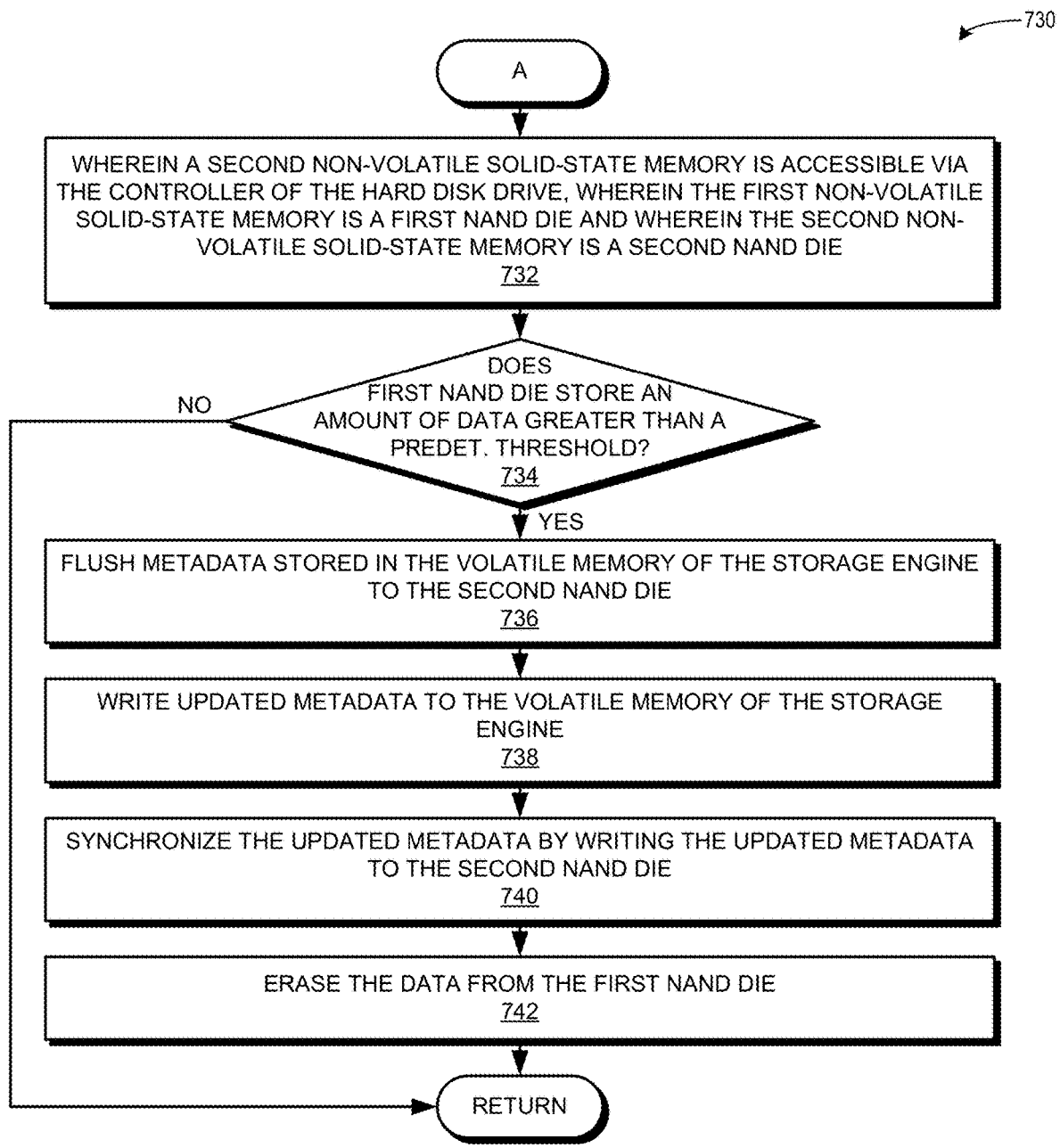
FIG. 7B presents a flowchart illustrating a method for facilitating operation of a storage system, including a switching/flushing/erasing operation, in accordance with an embodiment of the present application.

FIG. 7B presents a flowchart 730 illustrating a method for facilitating operation of a storage system, including a switching/flushing/erasing operation, in accordance with an embodiment of the present application. A second non-volatile solid-state memory is accessible via the controller of the hard disk drive, the first non-volatile solid-state memory is a first NAND die, and the second non-volatile solid-state memory is a second NAND die (operation 732). If the first NAND die does not store an amount of data greater than a predetermined threshold (decision 734), the operation returns.

If the first NAND die does store an amount of data greater than a predetermined threshold (decision 734), the system flushes metadata stored in the volatile memory of the storage engine to the second NAND die (operation 736) (i.e., a snapshot flush). The system writes updated metadata to the volatile memory of the storage engine (operation 738). The system synchronizes the updated metadata by writing the updated metadata to the second NAND die (operation 740). The system erases the data from the first NAND die (operation 742), and the operation returns.

Figure 7C:
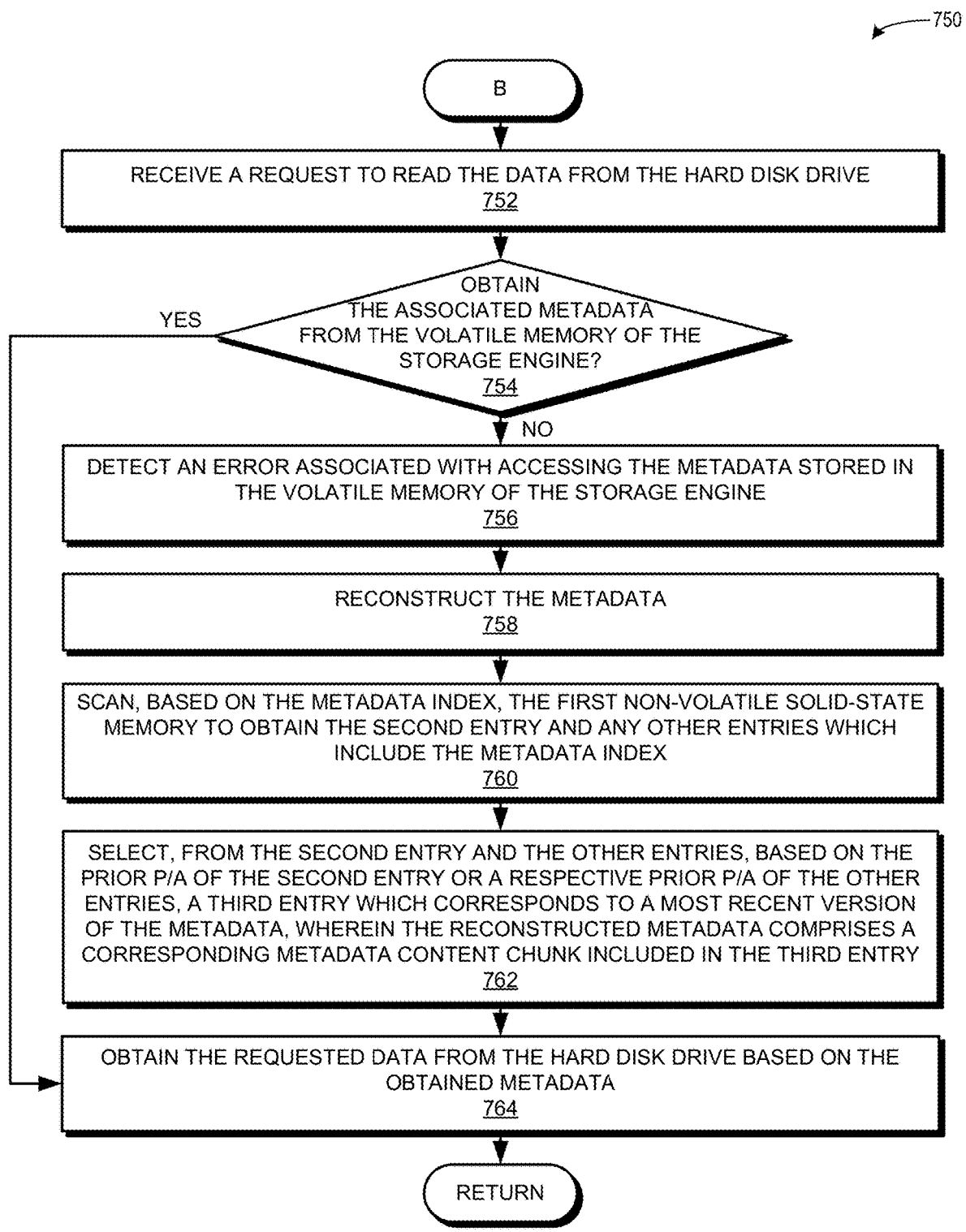
FIG. 7C presents a flowchart illustrating a method for facilitating operation of a storage system, including handling an error associated with accessing the metadata, in accordance with an embodiment of the present application.

FIG. 7C presents a flowchart 750 illustrating a method for facilitating operation of a storage system, including handling an error associated with accessing the metadata, in accordance with an embodiment of the present application. During operation, the system receives a request to read the data from the hard disk drive (operation 752). If the system successfully obtains the associated metadata from the volatile memory of the storage engine (decision 754), the system obtains the requested data from the hard disk drive based on the obtained metadata (operation 764), and the operation returns.

If the system does not successfully obtain the associated metadata from the volatile memory of the storage engine (decision 754), the system detects an error associated with accessing the metadata stored in the volatile memory of the storage engine (operation 756). The system reconstructs the metadata (operation 758), by the following operations. The system scans, based on the metadata index, the first non-volatile solid-state memory to obtain the second entry and any other entries which include the metadata index (operation 760). The system selects, from the second entry and the other entries, based on the prior physical address of the second entry or a respective prior physical address of the other entries, a third entry which corresponds to a most recent version of the metadata, wherein the reconstructed metadata comprises a corresponding metadata content chunk included in the third entry (operation 762). The system obtains the requested data from the hard disk drive based on the obtained metadata (operation 764), and the operation returns.

Thus, the embodiments described herein provide a hard disk drive (HDD) system which collaborates with host memory and NAND flash to isolate the metadata from the data, which allows the system to more efficiently allocate IOPS capability for accessing data without the conventional burden of also accessing (multiple times) the corresponding metadata in the HDD. By eliminating the IOPS consumption previously attributed to metadata access, the embodiments described herein can provide an enhanced and improved IOPS capability for applications, which can enable a high-capacity HDD system to more efficiently meet deployment requirements. The described embodiments: use a raw NAND flash (as pure data buckets) which only support append-only sequential writes; implement the switching/flushing/erasing operation by the host application through managed physical addresses; and share the modified controller to account for noise immunity and other efficiencies.

Exemplary Computer System and Apparatus

Figure 8:
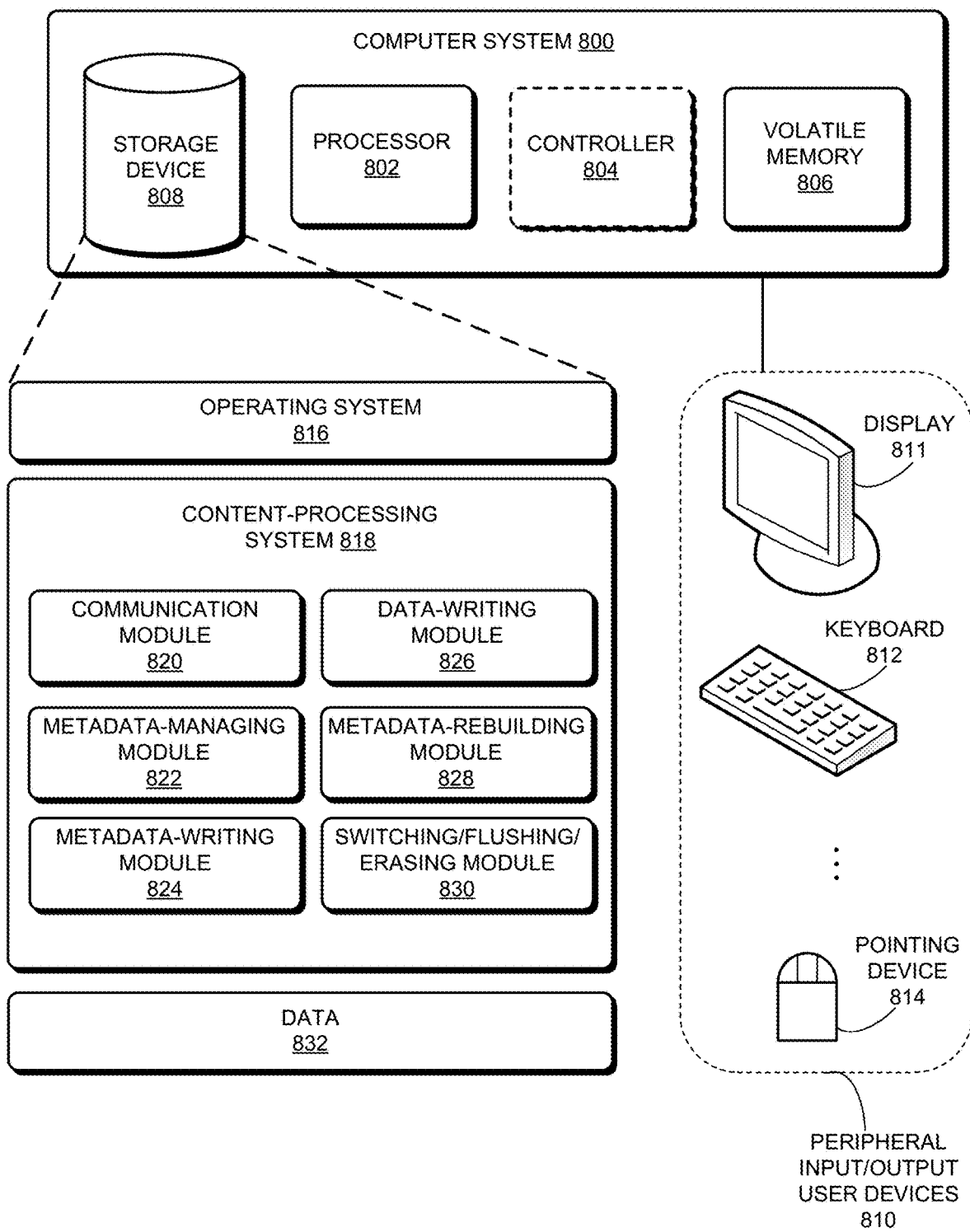
FIG. 8 illustrates an exemplary computer system that facilitates operation of a storage system, in accordance with an embodiment of the present application.

FIG. 8 illustrates an exemplary computer system that facilitates operation of a storage system, in accordance with an embodiment of the present application. Computer system 800 includes a processor 802, a volatile memory 806, and a storage device 808. In some embodiments, computer system 800 can include a controller 804 (indicated by the dashed lines). Volatile memory 806 can include, e.g., random access memory (RAM), that serves as a managed memory, and can be used to store one or more memory pools. Storage device 808 can include persistent storage which can be managed or accessed via processor 802 (or controller 804). In some embodiments, storage device 808 can correspond to HDD 240 of FIG. 2, and controller 804 may reside in HDD 240. Storage device 808 can also include embedded non-volatile solid-state memory (such as NAND flash, which can correspond to NANDs 252 and 254 of FIG. 2). Furthermore, computer system 800 can be coupled to peripheral input/output (I/O) user devices 810, e.g., a display device 811, a keyboard 812, and a pointing device 814. Storage device 808 can store an operating system 816, a content-processing system 818, and data 832. Computer system 800 can represent and include both a host (with a storage engine) and a storage device (such as a hard disk drive).

Content-processing system 818 can include instructions, which when executed by computer system 800, can cause computer system 800 or processor 802 to perform methods and/or processes described in this disclosure. Specifically, content-processing system 818 can include instructions for receiving and transmitting data packets, including data or metadata to be read or written and an input/output (I/O) request (e.g., a read request or a write request) (communication module 820).

Content-processing system 818 can further include instructions for receiving, by a storage engine, a request to write data to a hard disk drive (communication module 820). Content-processing system 818 can include instructions for determining metadata associated with the data (metadata-managing module 822). Content-processing system 818 can also include instructions for storing the metadata in a volatile memory of the storage engine (metadata-writing module 824). Content-processing system 818 can include instructions for identifying a physical address in a first non-volatile solid-state memory to which to write the metadata, wherein the first non-volatile solid-state memory is accessible via a controller of the hard disk drive (metadata-managing module 822). Content-processing system 818 can include instructions for writing the metadata to the first non-volatile solid-state memory based on the physical address (metadata-writing module 824). Content-processing system 818 can include instructions for writing the data to the hard disk drive (data-writing module 826).

Content-processing system 818 can additionally include instructions for determining that the first NAND die stores an amount of data which is greater than a first predetermined threshold (switching/flushing/erasing module 830). Content-processing system 818 can include instructions for flushing all metadata stored in the volatile memory of the storage engine to the second NAND die (switching/flushing/erasing module 830). Content-processing system 818 can also include instructions for writing any updated metadata to the volatile memory of the storage engine (metadata-writing module 824). Content-processing system 818 can include instructions for synchronizing the updated metadata by writing the updated metadata to the second NAND die (metadata-writing module 824). Content-processing system 818 can include instructions for erasing the data from the first NAND die (switching/flushing/erasing module 830).

Content-processing system 818 can further include instructions for detecting an error associated with accessing the metadata stored in the volatile memory of the storage engine (metadata-rebuilding module 828). Content-processing system 818 can include instructions for reconstructing the metadata (metadata-rebuilding module 828).

Data 832 can include any data that is required as input or generated as output by the methods and/or processes described in this disclosure. Specifically, data 832 can store at least: data; metadata; a request; a read request; a write request; an input/output (I/O) request; data or metadata associated with a read request, a write request, or an I/O request; a physical block address (PBA); an indicator or identifier of a plane, NAND die, or a non-volatile solid-state memory; a physical address; updated metadata; a next available location of a non-volatile solid-state memory; an indicator or identifier of a controller of a hard disk drive; an amount of data; a predetermined threshold; a data structure; an entry; a first entry; a metadata index; a plurality of metadata content chunks; a second entry; a NAND offset index; a physical address for a corresponding metadata chunk prior to a current update; a corresponding metadata content chunk; an error; a condition; a scan of a non-volatile solid-state memory; a most recent version of metadata; encoded data; processed data; and an indicator or identifier of a read head, a write head, or an interface.

Figure 9:
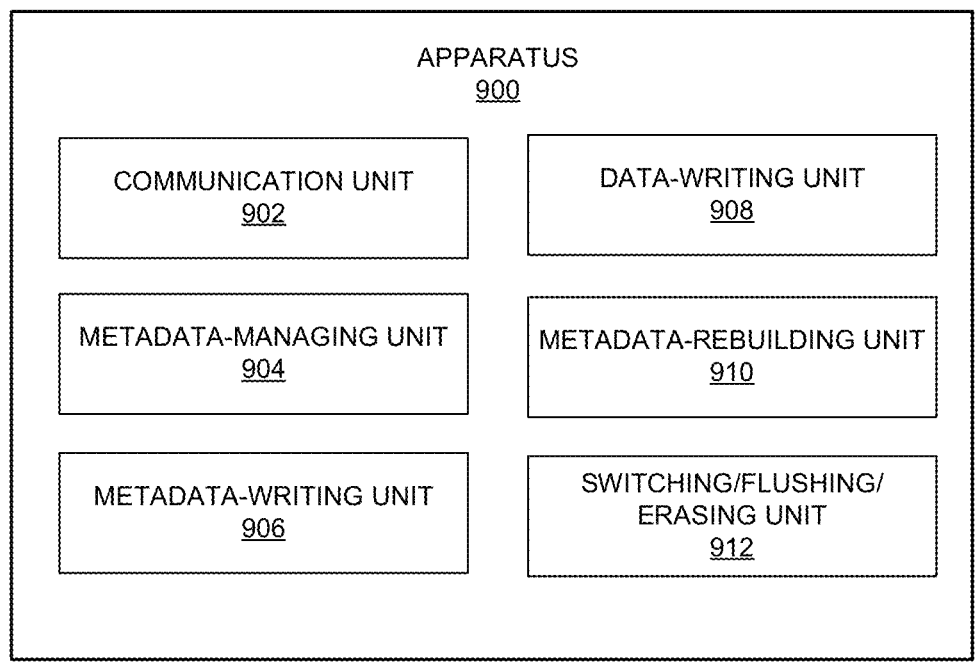
FIG. 9 illustrates an exemplary apparatus that facilitates operation of a storage system, in accordance with an embodiment of the present application.

FIG. 9 illustrates an exemplary apparatus 900 that facilitates operation of a storage system, in accordance with an embodiment of the present application. Apparatus 900 can comprise a plurality of units or apparatuses which may communicate with one another via a wired, wireless, quantum light, or electrical communication channel. Apparatus 900 may be realized using one or more integrated circuits, and may include fewer or more units or apparatuses than those shown in FIG. 9. Furthermore, apparatus 900 may be integrated in a computer system, or realized as a separate device or devices capable of communicating with other computer systems and/or devices. Apparatus 900 can include a hard disk drive, wherein a first non-volatile solid state memory is accessible via a controller of the hard disk drive.

Apparatus 900 can also include a storage engine with modules/units configured to perform various operations. Specifically, apparatus 900 can comprise modules or units 902-912 which are configured to perform functions or operations similar to modules 820-830 of computer system 800 of FIG. 8, including: a communication unit 902; a metadata-managing unit 904; a metadata-writing unit 906; a data-writing unit 908; a metadata-rebuilding unit 910; and a switching/flushing/erasing unit 912.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method, comprising:
receiving, by a storage engine, a request to write data to a hard disk drive;
determining metadata associated with the data;
storing the metadata in a volatile memory associated with the storage engine, wherein the metadata is stored in the volatile memory of the storage engine as a first entry based on a metadata index and a plurality of metadata content chunks;
identifying a physical address in a first non-volatile solid-state memory to which to write the metadata, wherein the first non-volatile solid-state memory is accessible via a controller of the hard disk drive;
writing the metadata to the first non-volatile solid-state memory sequentially based on the identified physical address at a next available location of the first non-volatile solid-state memory,
wherein the metadata is written as a second entry corresponding to the first entry and wherein the second entry includes:
a Not-AND (NAND) offset index which corresponds to the metadata index;
a physical address for a corresponding metadata content chunk prior to a current update; and
the corresponding metadata content chunk; and
writing the data to the hard disk drive.

2. The method of claim 1, further comprising:
determining that the metadata is an update to existing metadata stored in the storage engine; and
writing the updated metadata to the first non-volatile solid-state memory based on the identified physical address by appending the updated metadata at a next available location of the first non-volatile solid-state memory.

3. The method of claim 1,
wherein a second non-volatile solid-state memory is accessible via the controller of the hard disk drive,
wherein the first non-volatile solid-state memory is a first NAND die and the second non-volatile solid-state memory is a second NAND die, and
wherein a NAND die includes at least two planes.

4. The method of claim 3, further comprising:
determining that the first NAND die stores an amount of data which is greater than a first predetermined threshold;
flushing metadata stored in the volatile memory of the storage engine to the second NAND die;
writing updated metadata to the volatile memory of the storage engine;
synchronizing the updated metadata by writing the updated metadata to the second NAND die; and
erasing the data from the first NAND die.

5. The method of claim 1, wherein the method further comprises:
detecting an error associated with accessing the metadata stored in the volatile memory of the storage engine; and
reconstructing the metadata by:
scanning, based on the metadata index, the first non-volatile solid-state memory to obtain the second entry and any other entries which include the metadata index; and
selecting, from the second entry and the other entries, based on the prior physical address of the second entry or a respective prior physical address of the other entries, a third entry which corresponds to a most recent version of the metadata,
wherein the reconstructed metadata comprises a corresponding metadata content chunk included in the third entry.

6. The method of claim 1, wherein the hard disk drive controller comprises one or more of:
a cyclic redundancy check (CRC) encoder or decoder module;
a run limited length/maximum transition run (RLL/MTR) encoder or decoder module;
an error correction code (ECC) encoder or decoder module;
a low-density parity-check (LDPC) encoder or decoder module;
an interleaver or de-interleaver module;
a log likelihood ratio (LLR) generator module;
a redundant array of interdependent disks (RAID) management module;
an interface to a write head or a read head; and
a Toggle/Open NAND Flash Interface (ONFI).

7. The method of claim 1, further comprising:
receiving a request to read the data from the hard disk drive;
in response to successfully obtaining the associated metadata from the volatile memory of the storage engine, obtaining the requested data from the hard disk drive based on the associated metadata; and
in response to unsuccessfully obtaining the associated metadata from the volatile memory of the storage engine, obtaining the associated metadata from the first non-volatile solid-state memory.

8. The method of claim 7, wherein obtaining the associated metadata from the first non-volatile solid-state memory involves operations by one or more modules of the hard disk drive controller, including:
a Toggle/Open NAND Flash Interface (ONFI);
a log likelihood ratio (LLR) generator module;
an error correction code (ECC) encoder or decoder module;
a low-density parity-check (LDPC) encoder or decoder module;
a redundant array of interdependent disks (RAID) management module; and
a cyclic redundancy check (CRC) encoder or decoder module.

9. A computer system, comprising:
a storage engine;
a hard disk drive, wherein a first non-volatile solid state memory is accessible via a controller of the hard disk drive, and
wherein the storage engine comprises a processor and a memory coupled to the processor and storing instructions which, when executed by the processor cause the processor to perform a method, the method comprising:
receiving a request to write data to a hard disk drive;
determining metadata associated with the data;
storing the metadata in a volatile memory associated with the storage engine, wherein the metadata is stored in the volatile memory of the storage engine as a first entry based on a metadata index and a plurality of metadata content chunks;
identifying a physical address in the first non-volatile solid-state memory to which to write the metadata;
writing the metadata to the first non-volatile solid-state memory sequentially based on the identified physical address at a next available location of the first non-volatile solid-state memory, wherein the metadata is written as a second entry corresponding to the first entry and wherein the second entry includes:
  a Not-AND (NAND) offset index which corresponds to the metadata index:
  a physical address for a corresponding metadata content chunk prior to a current update; and
  the corresponding metadata content chunk; and
writing the data to the hard disk drive.

10. The computer system of claim 9, wherein the method further comprises:
determining that the metadata is an update to existing metadata stored in the storage engine; and
writing the updated metadata to the first non-volatile solid-state memory based on the identified physical address by appending the updated metadata at a next available location of the first non-volatile solid-state memory.

11. The computer system of claim 9,
wherein a second non-volatile solid-state memory is accessible via the controller of the hard disk drive,
wherein the first non-volatile solid-state memory is a first NAND die and the second non-volatile solid-state memory is a second NAND die, and
wherein a NAND die includes at least two planes.

12. The computer system of claim 11, wherein the method further comprises:
determining that the first NAND die stores an amount of data which is greater than a first predetermined threshold;
flushing metadata stored in the volatile memory of the storage engine to the second NAND die;
writing updated metadata to the volatile memory of the storage engine;
synchronizing the updated metadata by writing the updated metadata to the second NAND die; and
erasing the data from the first NAND die.

13. The computer system of claim 9, wherein the method further comprises:
detecting an error associated with accessing the metadata stored in the volatile memory of the storage engine; and
reconstructing the metadata by:
  scanning, based on the metadata index, the first non-volatile solid-state memory to obtain the second entry and any other entries which include the metadata index;
  selecting, from the second entry and the other entries, based on the prior physical address of the second entry or a respective prior physical address of the other entries, a third entry which corresponds to a most recent version of the metadata,
  wherein the reconstructed metadata comprises a corresponding metadata content chunk included in the third entry.

14. The computer system of claim 9, wherein the hard disk drive controller comprises one or more of:
a cyclic redundancy check (CRC) encoder or decoder module;
a run limited length/maximum transition run (RLL/MTR) encoder or decoder module;
an error correction code (ECC) encoder or decoder module;
a low-density parity-check (LDPC) encoder or decoder module;
an interleaver or de-interleaver module;
a log likelihood ratio (LLR) generator module;
a redundant array of interdependent disks (RAID) management module;
an interface to a write head or a read head; and
a Toggle/Open NAND Flash Interface (ONFI).

15. The computer system of claim 9, wherein the method further comprises:
receiving a request to read the data from the hard disk drive;
in response to successfully obtaining the associated metadata from the volatile memory of the storage engine, obtaining the requested data from the hard disk drive based on the associated metadata; and
in response to unsuccessfully obtaining the associated metadata from the volatile memory of the storage engine, obtaining the associated metadata from the first non-volatile solid-state memory.

16. An apparatus, comprising:
a hard disk drive, wherein a first non-volatile solid state memory is accessible via a controller of the hard disk drive, and
a storage engine configured to:
  receive a request to write data to a hard disk drive;
  determine metadata associated with the data;
  store the metadata in a volatile memory associated with the storage engine, wherein the metadata is stored in the volatile memory of the storage engine as a first entry based on a metadata index and a plurality of metadata content chunks;
  identify a physical address in the first non-volatile solid-state memory to which to write the metadata;
  write the metadata to the first non-volatile solid-state memory sequentially based on the identified physical address at a next available location of the first non-volatile solid-state memory,
  wherein the metadata is written as a second entry corresponding to the first entry and wherein the second entry includes:
    a Not-AND (NAND) offset index which corresponds to the metadata index:
    a physical address for a corresponding metadata content chunk prior to a current update; and
    the corresponding metadata content chunk; and
  write the data to the hard disk drive.

17. The apparatus of claim 16, wherein the storage engine is further configured to:
determine that the metadata is an update to existing metadata stored in the storage engine; and
write the updated metadata to the first non-volatile solid-state memory based on the identified physical address by appending the updated metadata at a next available location of the first non-volatile solid-state memory.

18. The apparatus of claim 16,
wherein a second non-volatile solid-state memory is accessible via the controller of the hard disk drive,
wherein the first non-volatile solid-state memory is a first NAND die and the second non-volatile solid-state memory is a second NAND die, and
wherein a NAND die includes at least two planes.

19. The apparatus of claim 18, wherein the controller of the hard disk drive is configured to:
determine that the first NAND die stores an amount of data which is greater than a first predetermined threshold;
flush metadata stored in the volatile memory of the storage engine to the second NAND die, wherein the storage engine is further configured to write updated metadata to the volatile memory of the storage engine;
synchronize the updated metadata by writing the updated metadata to the second NAND die; and
erase the data from the first NAND die.

20. The apparatus of claim 16, wherein the storage engine is further configured to:
detect an error associated with accessing the metadata stored in the volatile memory of the storage engine; and
reconstruct the metadata by:
scanning, based on the metadata index, the first non-volatile solid-state memory to obtain the second entry and any other entries which include the metadata index; and
selecting, from the second entry and the other entries, based on the prior physical address of the second entry or a respective prior physical address of the other entries, a third entry which corresponds to a most recent version of the metadata,
wherein the reconstructed metadata comprises a corresponding metadata content chunk included in the third entry.

\* \* \* \* \*